United States Patent
Kuba et al.

(10) Patent No.: US 12,309,021 B2
(45) Date of Patent: May 20, 2025

(54) RELAY DEVICE, RELAY SYSTEM, RELAY METHOD AND COMPUTER-READABLE RECORDING MEDIUM THAT REDUCE A TRAFFIC LOAD ON A COMMUNICATION DEVICE

(71) Applicant: MITSUBISHI ELECTRIC CORPORATION, Tokyo (JP)

(72) Inventors: Ryohei Kuba, Tokyo (JP); Sachiko Taniguchi, Tokyo (JP); Ryusuke Kawate, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 401 days.

(21) Appl. No.: 17/867,808

(22) Filed: Jul. 19, 2022

(65) Prior Publication Data
US 2022/0353132 A1 Nov. 3, 2022

Related U.S. Application Data

(63) Continuation of application No. PCT/JP2020/010996, filed on Mar. 13, 2020.

(51) Int. Cl.
*H04L 41/0654* (2022.01)
(52) U.S. Cl.
CPC .............................. *H04L 41/0654* (2013.01)
(58) Field of Classification Search
CPC .............................. H04L 12/437; H04L 45/32
See application file for complete search history.

(56) References Cited

U.S. PATENT DOCUMENTS

| 7,116,672 B1 * | 10/2006 | Sivakumar | H04L 45/32 370/468 |
| 7,965,623 B1 * | 6/2011 | Sivasankaran | H04L 49/557 370/219 |

(Continued)

FOREIGN PATENT DOCUMENTS

| JP | 2008-301003 A | 12/2008 |
| JP | 2011-29829 A | 2/2011 |

(Continued)

OTHER PUBLICATIONS

Indian Office Action for Indian Application No. 202247046701, dated Dec. 7, 2022, with English translation.

(Continued)

*Primary Examiner* — Mohammad S Anwar
(74) *Attorney, Agent, or Firm* — BIRCH, STEWART, KOLASCH & BIRCH, LLP

(57) ABSTRACT

The conventional relay device has a problem that a traffic load on a communication device is large when an output port of a frame including a destination address, which an address table has not learned yet, is a port connected to a branch circuit, since flooding is performed on all ports except for a port that has received the frame. A relay device (21) is provided with a destination determination unit (41) to transfer, when a time clocked by a timer unit (40) to start clocking is within a set time, a frame to ports (511 and 512) connected to trunk circuits (61 and 64), and when the time clocked by the timer unit (40) exceeds the set time, to transfer the frame to the ports (511 and 512) connected to the trunk circuits (61 and 64) and a port (513) connected to a branch circuit (65), in a case wherein it is impossible for a search unit (43) to obtain from a first storage unit (33) a port number corresponding to a destination address included in the frame received, and the first storage unit (33) is cleared.

9 Claims, 13 Drawing Sheets

(56) References Cited

U.S. PATENT DOCUMENTS

| | | | |
|---|---|---|---|
| 2006/0098571 A1* | 5/2006 | Takefman | H04L 12/427 370/222 |
| 2008/0298371 A1 | 12/2008 | Kobatake | |
| 2011/0019679 A1* | 1/2011 | Akahane | H04L 49/201 370/401 |
| 2013/0083647 A1* | 4/2013 | Xie | H04L 12/437 370/216 |
| 2014/0301403 A1 | 10/2014 | Yabe | |
| 2014/0328160 A1* | 11/2014 | Zhou | H04L 12/1886 370/218 |
| 2016/0056995 A1 | 2/2016 | Kariya | |
| 2016/0142224 A1 | 5/2016 | Yoshida et al. | |
| 2017/0093696 A1 | 3/2017 | Kariya et al. | |

FOREIGN PATENT DOCUMENTS

| | | |
|---|---|---|
| JP | 2016-46684 A | 4/2016 |
| JP | 2016-100621 A | 5/2016 |
| JP | 2017-5405 A | 1/2017 |
| JP | 2017-28615 A | 2/2017 |
| JP | 2017-41823 A | 2/2017 |
| JP | 2018-129694 A | 8/2018 |
| JP | 2019-129391 A | 8/2019 |
| WO | WO 99/00950 A1 | 1/1999 |

OTHER PUBLICATIONS

International Search Report (PCT/ISA/210) issued in PCT/JP2020/010996 mailed on Jun. 9, 2020.
Written Opinion (PCT/ISA/237) issued in PCT/JP2020/010996 mailed on Jun. 9, 2020.
Extended European Search Report for European Application No. 20924059.7, dated Jan. 5, 2023.

\* cited by examiner

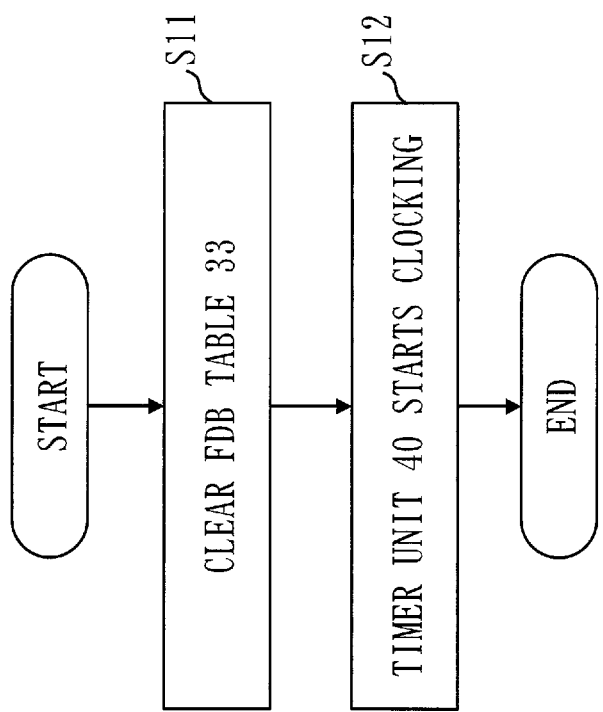

Fig. 8

FDB TABLE (A) SW1  331

| PORT ATTRIBUTE | OUTPUT PORT | MAC ADDRESS |
| --- | --- | --- |
| EXTERNAL CIRCUIT | P3 | MAC ADDRESS A |
| RING CIRCUIT | P1 | MAC ADDRESS B |
| RING CIRCUIT | P2 | MAC ADDRESS C |
| RING CIRCUIT | P2 | MAC ADDRESS D |

(B) SW2  332

| PORT ATTRIBUTE | OUTPUT PORT | MAC ADDRESS |
| --- | --- | --- |
| RING CIRCUIT | P2 | MAC ADDRESS A |
| EXTERNAL CIRCUIT | P3 | MAC ADDRESS B |
| RING CIRCUIT | P2 | MAC ADDRESS C |
| RING CIRCUIT | P2 | MAC ADDRESS D |

(C) SW3  333

| PORT ATTRIBUTE | OUTPUT PORT | MAC ADDRESS |
| --- | --- | --- |
| RING CIRCUIT | P1 | MAC ADDRESS A |
| RING CIRCUIT | P1 | MAC ADDRESS B |
| EXTERNAL CIRCUIT | P3 | MAC ADDRESS C |
| RING CIRCUIT | P1 | MAC ADDRESS D |

(D) SW4  334

| PORT ATTRIBUTE | OUTPUT PORT | MAC ADDRESS |
| --- | --- | --- |
| RING CIRCUIT | P1 | MAC ADDRESS A |
| RING CIRCUIT | P1 | MAC ADDRESS B |
| RING CIRCUIT | P2 | MAC ADDRESS C |
| EXTERNAL CIRCUIT | P3 | MAC ADDRESS D |

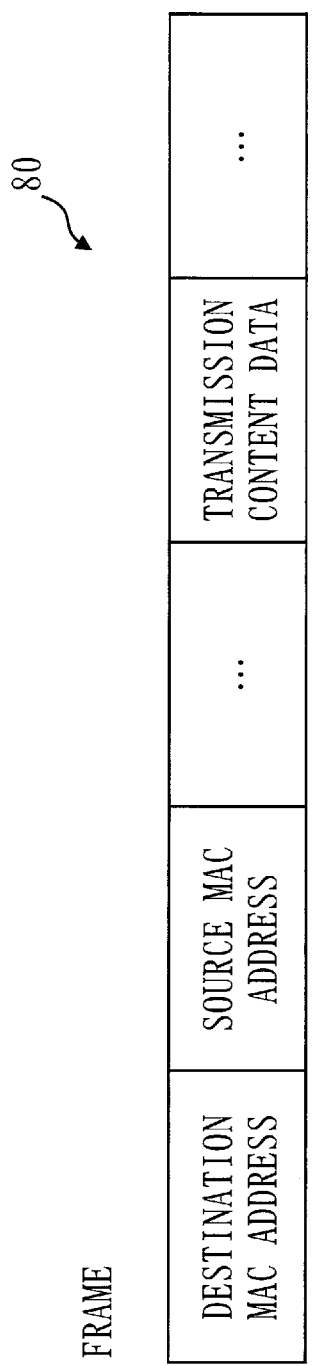

Fig.11

FDB TABLE (A) SW1 — 331

| PORT ATTRIBUTE | OUTPUT PORT | MAC ADDRESS |
|---|---|---|
| EXTERNAL CIRCUIT | P3 | MAC ADDRESS A |
| RING CIRCUIT | P1 | MAC ADDRESS B |
| RING CIRCUIT | P1 | MAC ADDRESS C |
| RING CIRCUIT | P2 | MAC ADDRESS D |

(B) SW2 — 332

| PORT ATTRIBUTE | OUTPUT PORT | MAC ADDRESS |
|---|---|---|
| RING CIRCUIT | P2 | MAC ADDRESS A |
| EXTERNAL CIRCUIT | P3 | MAC ADDRESS B |
| RING CIRCUIT | P1 | MAC ADDRESS C |
| RING CIRCUIT | P2 | MAC ADDRESS D |

(C) SW3 — 333

| PORT ATTRIBUTE | OUTPUT PORT | MAC ADDRESS |
|---|---|---|
| RING CIRCUIT | P2 | MAC ADDRESS A |
| RING CIRCUIT | P2 | MAC ADDRESS B |
| EXTERNAL CIRCUIT | P3 | MAC ADDRESS C |
| RING CIRCUIT | P2 | MAC ADDRESS D |

(D) SW4 — 334

| PORT ATTRIBUTE | OUTPUT PORT | MAC ADDRESS |
|---|---|---|
| RING CIRCUIT | P1 | MAC ADDRESS A |
| RING CIRCUIT | P1 | MAC ADDRESS B |
| RING CIRCUIT | P1 | MAC ADDRESS C |
| EXTERNAL CIRCUIT | P3 | MAC ADDRESS D |

Fig.12

PORT SET INFORMATION TABLE (A) SW1

361

| OUTPUT PORT | PORT ATTRIBUTE | OPERATION STATE |
|---|---|---|
| P1 | RING CIRCUIT | 1 |
| P2 | RING CIRCUIT | 1 |
| P3 | EXTERNAL CIRCUIT | 1 |

(B) SW2

362

| OUTPUT PORT | PORT ATTRIBUTE | OPERATION STATE |
|---|---|---|
| P1 | RING CIRCUIT | 0 |
| P2 | RING CIRCUIT | 1 |
| P3 | EXTERNAL CIRCUIT | 1 |

(C) SW3

363

| OUTPUT PORT | PORT ATTRIBUTE | OPERATION STATE |
|---|---|---|
| P1 | RING CIRCUIT | 1 |
| P2 | RING CIRCUIT | 0 |
| P3 | EXTERNAL CIRCUIT | 1 |

(D) SW4

364

| OUTPUT PORT | PORT ATTRIBUTE | OPERATION STATE |
|---|---|---|
| P1 | RING CIRCUIT | 1 |
| P2 | RING CIRCUIT | 1 |
| P3 | EXTERNAL CIRCUIT | 1 |

Fig.13

PORT SET INFORMATION TABLE (A) SW1  361

| OUTPUT PORT | PORT ATTRIBUTE | OPERATION STATE |
|---|---|---|
| P1 | RING CIRCUIT | 1 |
| P2 | RING CIRCUIT | 1 |
| P3 | EXTERNAL CIRCUIT | 1 |

(B) SW2  362

| OUTPUT PORT | PORT ATTRIBUTE | OPERATION STATE |
|---|---|---|
| P1 | RING CIRCUIT | 1 |
| P2 | RING CIRCUIT | 1 |
| P3 | EXTERNAL CIRCUIT | 1 |

(C) SW3  363

| OUTPUT PORT | PORT ATTRIBUTE | OPERATION STATE |
|---|---|---|
| P1 | RING CIRCUIT | 0 |
| P2 | RING CIRCUIT | 1 |
| P3 | EXTERNAL CIRCUIT | 1 |

(D) SW4  364

| OUTPUT PORT | PORT ATTRIBUTE | OPERATION STATE |
|---|---|---|
| P1 | RING CIRCUIT | 1 |
| P2 | RING CIRCUIT | 0 |
| P3 | EXTERNAL CIRCUIT | 1 |

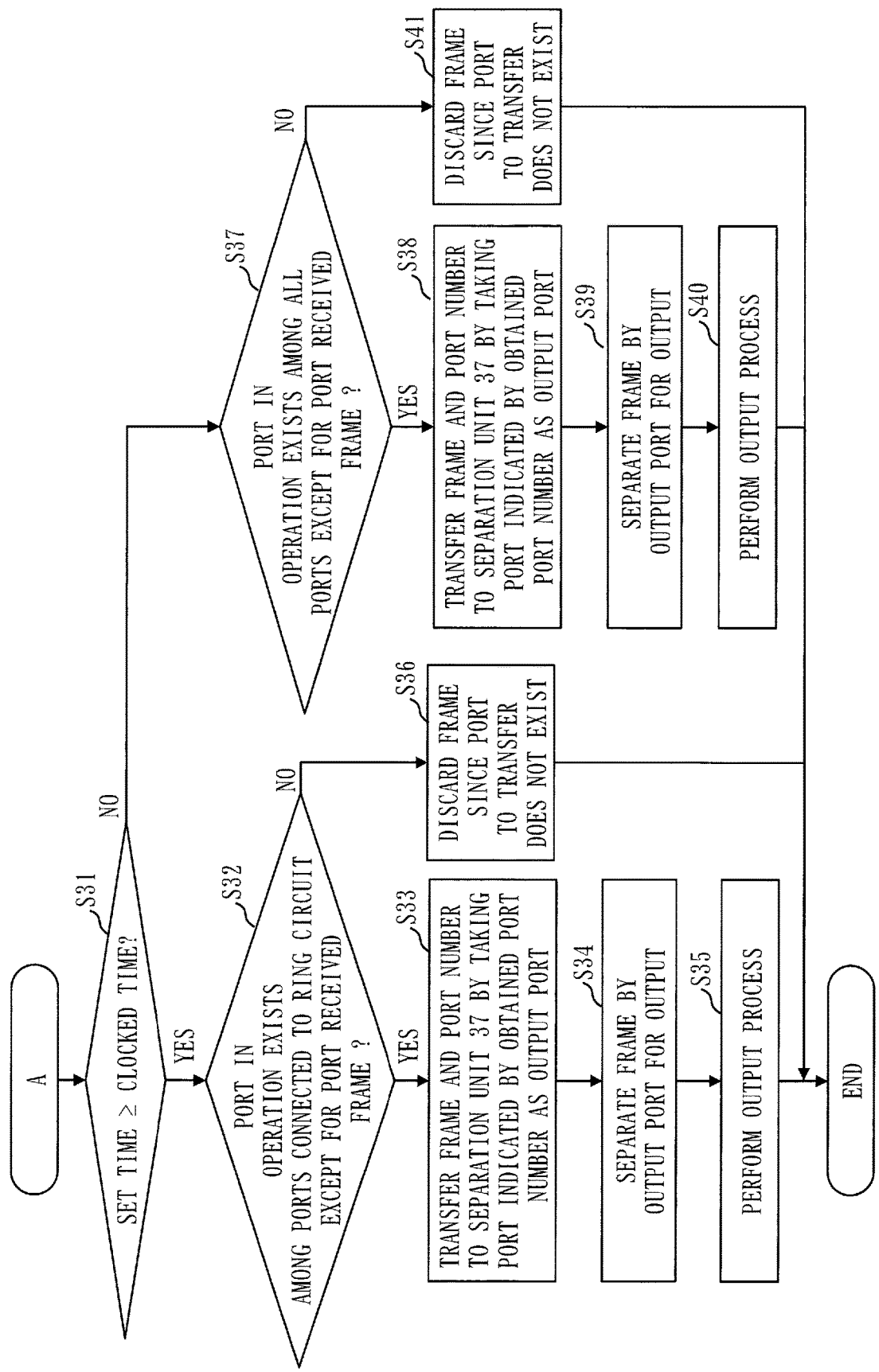

RELAY DEVICE, RELAY SYSTEM, RELAY METHOD AND COMPUTER-READABLE RECORDING MEDIUM THAT REDUCE A TRAFFIC LOAD ON A COMMUNICATION DEVICE

CROSS REFERENCE TO RELATED APPLICATIONS

This application is a Continuation of PCT International Application No. PCT/JP2020/010996, filed on Mar. 13, 2020, which is hereby expressly incorporated by reference into the present application.

TECHNICAL FIELD

The present invention relates to a relay device, a relay method, a relay program, and a relay system using the relay device used for relay of a frame transmitted and received via a network.

BACKGROUND ART

A network to transfer a frame transmitted and received between communication devices is composed of a trunk network connecting a plurality of relay devices via a circuit and a branch network connecting each relay device and a communication device being an end node. When a communication failure occurs in the trunk network, since there is a significant influence on the entire network, reliability of the network is improved by configuring the trunk network through connecting a plurality of relay devices via a plurality of paths to attain redundancy.

The relay devices relay frames transmitted and received between communication devices, and include ports, whereto circuits of the trunk network or the branch network are connected, via which the frames are transmitted and received. Each relay device includes an address table such as an FDB (filtering database) table, etc. to store an address of a communication device and information including an identification number of a port corresponding to the address of the communication device in pairs, and the address table stores a port to output corresponding to a destination address included in the frame received. Hereinafter, an identification number of a port is simply called a port number.

When the relay device receives a frame from another relay device or a communication device, by obtaining a port number corresponding to an address identical with a destination address included in the frame, from the address table, and transferring the frame received from a port indicated by the port number obtained, the relay device relays the frame to a communication device existing beyond the port.

Meanwhile, the relay device relays the frame and performs a learning process to learn the address table at the same time. The learning process of the address table is to learn through associating a transmission source address included in the frame received by the relay device with the port number of the port that has received the frame, and storing the transmission source address and the port number in the address table. This learning process of the address table is performed every time a frame is received.

When a failure occurs in a network, the necessity to switch a transfer path of a frame to be transferred to each destination address to another redundant transfer path arises, and there is also the necessity to switch the port to output the frame in each relay device based on the other transfer path switched. In this case, each relay device in the network first clears the address table, and then performs the learning process of the address table.

In a case wherein the relay device receives a frame from another relay device or a communication device when the address table is cleared, a port number of a port corresponding to a destination address included in the frame may not have been learned yet from the address table despite that the port number is a unicast address. In this case, since the port number corresponding to the destination address has not been stored, flooding is performed wherein the frame received is transferred from all the ports except for the port that has received the frame. By this flooding, at the time of frame transfer after the address table is cleared, the relay device is capable of relaying the frame to a communication device desired to transfer the frame to even when the frame of an unlearned destination address is received.

However, by this flooding, since the number of frames transferred to the communication device of the destination address whereto transfer of the frame is originally unnecessary is increased, the traffic load is increased, and a communication speed and quality of the communication device are badly affected. A technique to suppress the traffic load due to this flooding is disclosed in Patent Literature 1.

Patent Literature 1 discloses, in each relay device connected to a circuit included in a ring network being one redundant trunk network, information on whether an output port associated with each address of a communication device is a port connected to the ring circuit being a circuit of a ring network is stored, and when a frame including a destination address which the address table has not learned yet is received, in a case wherein the output port being an output for the frame is a port connected to the ring circuit, flooding is performed to ports connected to the ring circuit among all ports except for the port that has received the frame; whereas in a case wherein the output port is not a port connected to a ring circuit, that is, the output port is a port connected to a branch circuit being a circuit of a branch network, flooding is performed for all ports except for the port that has received the frame. When the output port is a port connected to the ring circuit, since there is no need to transfer the frame to the communication device connected to the relay device, by adopting a similar configuration as in Patent Literature 1, an unnecessary frame is prevented from being transferred to the communication device connected to the relay device, and the traffic load is suppressed.

CITATION LIST

Patent Literature

Patent Literature 1: JP2011-29829 A

SUMMARY OF INVENTION

Technical Problem

However, in the conventional relay device as described above, in a case wherein an output port being an output for a frame including a destination address which an address table has not learned yet is a port connected to a branch circuit, since flooding is performed for all ports except for a port that has received the frame, a traffic load on a communication device is large.

The present invention is aimed at solving the problem as mentioned above, and aimed at providing a relay device, a relay system, a relay method and a relay program able to reduce the traffic load on a communication device connected to the relay device in a case wherein a frame including a destination address which an address table has not learned yet is received, and an output port being an output for the frame for which flooding is performed is a port connected to a branch circuit.

Solution to Problem

There is provided according to one aspect of the present invention, a relay device includes:

a port that is connected to a trunk circuit included in a trunk network which is made redundant;

a port that is connected to a branch circuit included in a branch network whereto a communication device is connected;

a first storage unit to store an address of the communication device, and a port number indicating the port corresponding to the address;

a timer unit to start clocking in a case wherein the first storage unit is cleared when a transfer path of the trunk network to transfer a frame received via the port is switched;

a search unit to search whether the port number corresponding to the address identical with a destination address included in the frame is stored in the first storage unit, and when the port number is stored, to obtain the port number stored; and a destination determination unit to transfer the frame to the port indicated by the port number when the search unit obtains the port number; to transfer the frame to a port that is connected to the trunk circuit among the port connected to the trunk circuit and a port connected to the branch circuit when the search unit fails to obtain the port number, and when a clocked time is within a set time; and to transfer the frame to the port connected to the trunk circuit and the port connected to the branch circuit when the search unit fails to obtain the port number, and when the clocked time exceeds the set time.

Advantageous Effects of Invention

According to the present invention, in a case wherein a frame including a destination address which an address table has not learned yet is received, and a time counted by a timer unit is within a set time, the frame is transferred to a port connected to a trunk circuit among a port connected to the trunk circuit included in a trunk network and a port connected to a branch circuit included in a branch network; therefore, within the set time, in a case wherein an output port being an output for the frame including the destination address which the address table has not learned yet is a port connected to the branch circuit, the number of frames to be transferred to a communication device connected to a relay device does not become large, which makes it possible to suppress a traffic load on the communication device.

BRIEF DESCRIPTION OF DRAWINGS

FIG. 7 is a flowchart illustrating an operation in a case wherein an ERP unit detects a clearing condition of the FDB table according to the first embodiment;

FIG. 8 is one example of the FDB table of each relay device before a failure in FIG. 1 occurs according to the first embodiment;

FIG. 10 is one example of a frame according to the first embodiment;

FIG. 11 is one example of the FDB table of each relay device after a failure occurs in FIG. 6 according to the first embodiment;

FIG. 12 is one example of a port set information table of each relay device before the failure in FIG. 1 occurs according to the first embodiment;

FIG. 13 is one example of the port set information table of each relay device after the failure occurs in FIG. 6 according to the first embodiment; and FIG. 14 is a flowchart illustrating a process A being a continuation of the transfer operation of the unicast frame according to the first embodiment.

DESCRIPTION OF EMBODIMENT

First Embodiment

It is possible to apply a relay device according to a first embodiment to a network system composed of a trunk network made redundant and a branch network connecting the trunk network with a communication device. As one example of the trunk network, there is an ERP (Ethernet (registered trademark) ring protection) system defined by a standard specification, ITU-T (international telecommunication union telecommunication standardization sector) G.8032, being one of a ring trunk network. In the first embodiment, description will be provided on a relay system 1 wherein the relay device of the present invention is applied to an ERP system.

Figure 1:
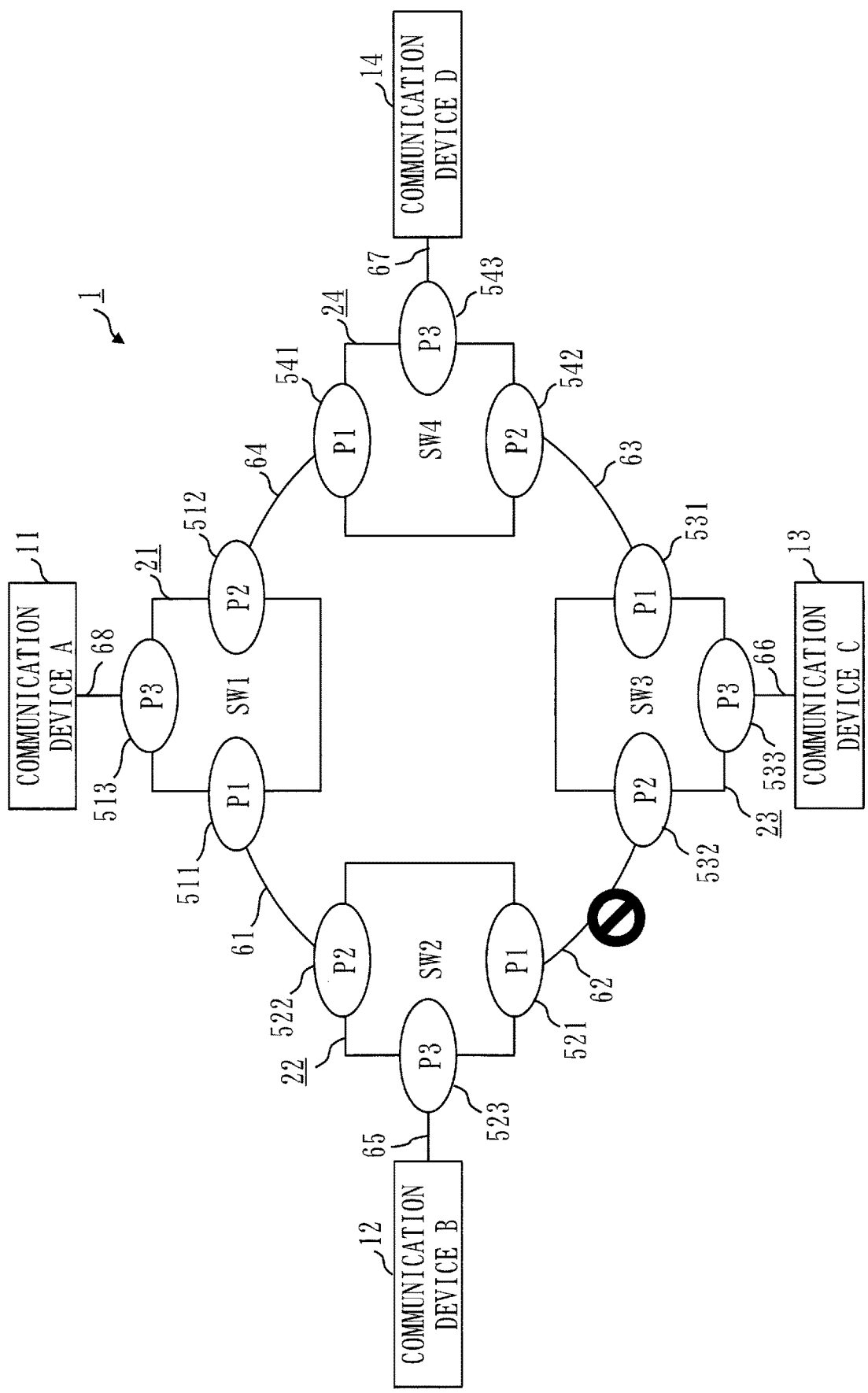
FIG. 1 is a block diagram of a relay system according to a first embodiment.

FIG. 1 is a block diagram of a relay system 1 according to the first embodiment. The relay system 1 includes four communication devices 11 to 14, four relay devices 21 to 24, ring circuits 61 to 64 that connect adjacent relay devices, external circuits 65 to 68 that connect the relay devices 21 to 24 with the communication devices 11 to 14.

A ring trunk network is formed by the relay devices 21 to 24 and the ring circuits 61 to 64, and a branch network is formed by the relay device 21, the external circuit 68 and the communication device 11. Similarly, a branch network is formed by the relay device 22, the external circuit 65 and the communication device 12, a branch network is formed by the relay device 23, the external circuit 66 and the communication device 13, and a branch network is formed by the relay device 24, the external circuit 67 and the communication device 14. A trunk circuit that constitutes a part of the redundant ring trunk network is the ring circuits 61 to 64, and a branch circuit that constitutes a part of the branch network whereto the communication devices 11 to 14 are connected is the external circuits 65 to 68.

The relay devices 21 to 24 are switches to transfer a frame transmitted and received on the present relay system 1, and in FIG. 1, the relay device 21 is denoted by SW1, the relay device 22 is denoted by SW2, the relay device 23 is denoted by SW3, and the relay device 24 is denoted by SW4.

Each of the relay devices 21 to 24 includes three ports, and specifically, the relay device 21 includes a port 511 connected to the ring circuit 61, a port 512 connected to the ring circuit 64, and a port 513 connected to an external circuit 68. Similarly, the relay device 22 includes a port 521 connected to the ring circuit 62, a port 522 connected to the ring circuit 61, a port 523 connected to the external circuit 65; the relay device 23 includes a port 531 connected to the ring circuit 63, a port 532 connected to the ring circuit 62, and a port 533 connected to the external circuit 66; and the relay device 24 includes a port 541 connected to the ring circuit 64, a port 542 connected to the ring circuit 63, and a port 543 connected to the external circuit 67. In FIG. 1, ports P1 to P3 are port numbers indicating ports included in each of the relay devices 21 to 24, wherein P1 and P2 are the ports connected to the ring circuits, and P3 are the ports connected to the external circuits.

Each of the relay devices 21 to 24 operate as switches by transferring a frame received from any of the ports to another port, wherein there exists a layer 2 switch using ERP, for instance; however, the relay devices 21 to 24 are not limited to the layer 2 switch if only it is possible for the relay devices 21 to 24 to transfer the frame.

The communication devices 11 to 14 are terminals to perform transmission and reception of data on the present system such as system monitor devices and system control devices, etc., for example; however, the communication devices 11 to 14 may be arbitrary devices such as PCs (personal computers) and home electric appliances, etc. only if the communication devices 11 to 14 are equipment which can transmit and receive frames via a network. In FIG. 1, the communication device 11 is denoted by a communication device A, the communication device 12 is denoted by a communication device B, the communication device 13 is denoted by a communication device C, and the communication device 14 is denoted by a communication device D.

The trunk network in the relay system 1 illustrated in FIG. 1 is a ring network connected in a ring shape, wherein a frame continue looping while the ring-shaped connection is maintained, and a phenomenon that unnecessary frames overflow from the circuits occurs; therefore, a part of the ring-shaped path, for instance, the ring circuit 62 between the relay device 22 and the relay device 23 is closed. Specifically, the port 521 of the relay device 22 is set as a closed port. When such a setting is made, for example, in a case wherein a frame is transmitted from the communication device 12 to the communication device 13, the relay device 22 that receives the frame transmitted from the communication device 12 at the port 523 outputs the frame from the port 522, then, the frame is transferred to the relay device 21, the relay device 24 and the relay device 23 in this order, and is transmitted to the communication device 13 from the port 533 of the relay device 23.

Figure 2:
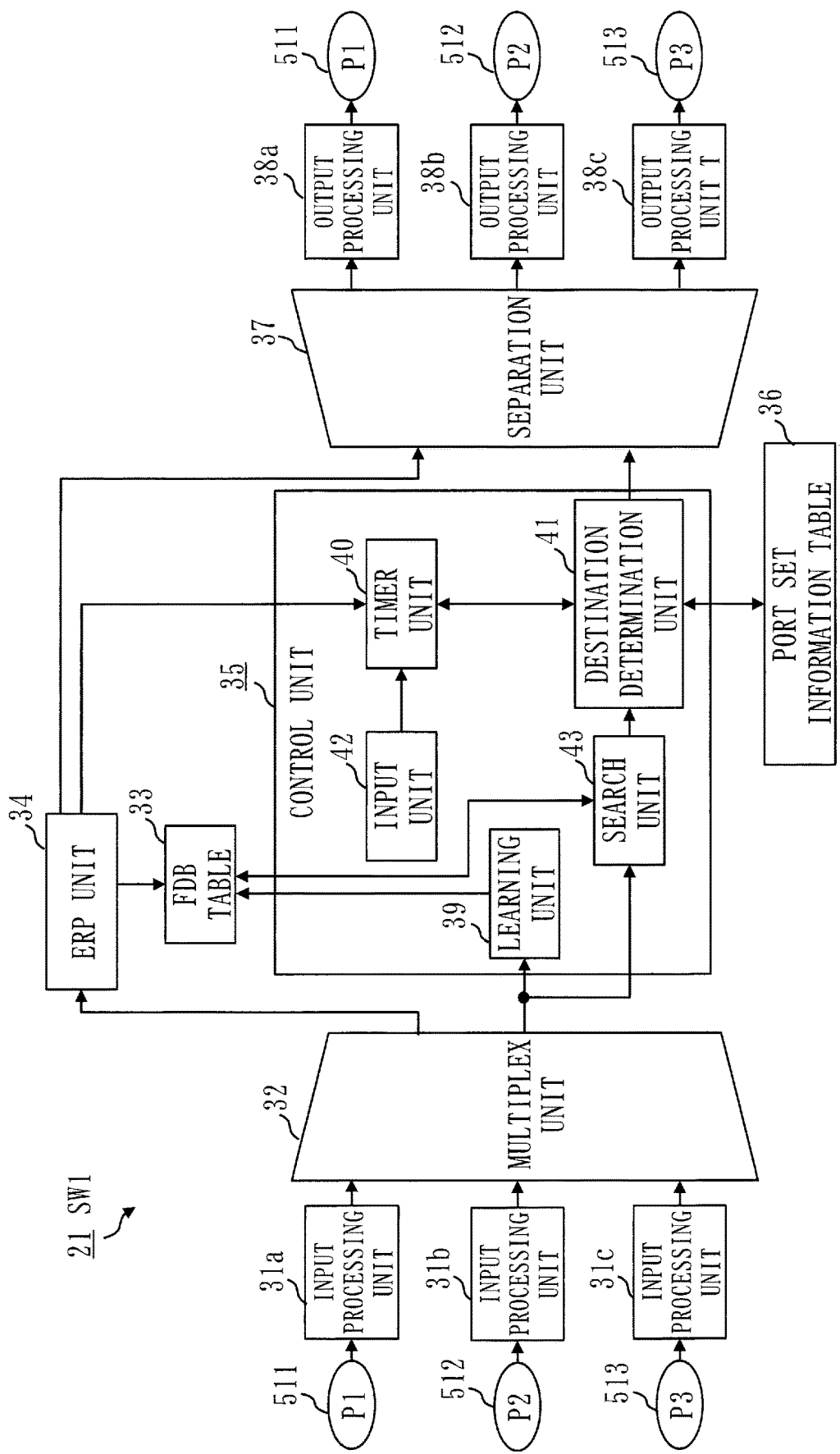
FIG. 2 is a block diagram of a relay device according to the first embodiment.

As described, by configuring a trunk network to have a redundant structure wherein a plurality of paths exist for connecting a plurality of relay devices, it is made possible to maintain a state wherein communication is possible by switching a communication path to another path even when a failure occurs in a certain circuit. Hereinafter, a detailed description will be made on a case wherein the present invention is applied to a redundant network as described FIG. 2 is a block diagram of the relay device 21 according to the present embodiment 1. The relay device 21 includes ports 511 and 512, the port 513, input processing units 31a to 31c, a multiplex unit 32, an FDB table 33, and an ERP unit 34. The ports 511 and the port 512 are connected respectively to ring circuits 61 and 64 as trunk circuits constituting a part of the ring redundant trunk network as described above. The port 513 is connected to the external circuit 68 as a branch circuit constituting a part of the branch network. The input processing units 31a to 31c perform input processing of frames received from each of the ports 511 to 513. The multiplex unit 32 performs multiplexing to integrate frames whereon input processing has been performed by the input processing units 31a to 31c. The FDB table 33 as a first storage unit stores addresses of communication devices and port numbers indicating ports corresponding to the addresses. The ERP unit 34 clears the FDB table 33, and makes clocking by a timer unit 40 start in a case wherein the FDB table 33 is cleared at a switching time of a transfer path in the trunk network to transfer the frame received via the ports 511 to 513. The case wherein the FDB table 33 is cleared at the switching time of the transfer path is a case wherein a clearing condition of the FDB table 33 is detected accompanying switching of the transfer path in the trunk network. When this ERP unit 34 detects a failure occurrence in the network from a reception state of a failure notification frame and from the state of devices, etc., and switching of the transfer path in the trunk network becomes necessary, the ERP unit 34 generates a direction to clear the FDB table 33, and generates and transfers the failure notification frame, and so forth. A case wherein the clearing condition of the FDB table 33 accompanying switching of the transfer path in the trunk network is detected corresponds to, for example, a case wherein a failure notification frame storing information including the clear request of the FDB table 33 is received, a case wherein a failure notification frame wherein storage information has been changed is received, a case wherein a failure of a trunk circuit is detected by the relay device 21 itself, and a case wherein a transfer path is forcibly switched by a setting, etc.

Further, the relay device 21 includes a port set information table 36, a control unit 35, a separation unit 37, and output processing units 38a to 38c. The port set information table 36 is a table wherein information on an operation mode for each port is stored. The control unit 35 decides an output port being an output destination for the frame received by use of the FDB table 33 and the port set information table 36, and performs learning of the FDB table 33. The separation unit 37 transfers the frame for which the output port being the output destination has been decided by the control unit 35 to output processing units 38a to 38c whereto the output port decided is connected. The output processing units 38a to 38c perform output processing of the frame transferred from the separation unit 37.

Next, a configuration of the control unit 35 will be described. The control unit 35 includes a learning unit 39, a timer unit 40, a destination determination unit 41, an input unit 42 and a search unit 43. The learning unit 39 performs learning processing to store a port number stored in the FDB table 33 corresponding to an address identical with a transmission source address included in the frame received via a port as a port number to indicate the port that has received the frame. The search unit 43 searches whether the port number corresponding to the address identical with the destination address included in the frame received via the port is stored in the FDB table 33, and if stored, obtains the port number stored. The input unit 42 accepts an input of a value of a set time. The timer unit 40 sets a value input in the input unit 42 as the set time, and starts clocking in a case wherein the FDB table 33 is cleared at a switching time of a transfer path in the trunk network to transfer a frame received via the ports 511 to 513, and performs clocking until the set time accepted by the input unit 42. The destination determination unit 41 transfers: in a case wherein the search unit 43 obtains the port number corresponding to the destination address as a result of search in the FDB table 33, the frame to the port indicated by the port number; in a case wherein the search unit 43 fails to obtain the port number corresponding to the destination address as a result of search in the FDB table 33, and the time clocked by the timer unit 40 is within the set time, the frame to the ports 511 and 512 connected to a ring circuit among the ports 511 and 512 connected to the ring circuit and the port 513 connected to the external circuit; in a case wherein the search unit 43 fails to obtain the port number corresponding to the destination address as a result of search in the FDB table 33, and the time clocked by the timer unit 40 exceeds the set time, the frame to the ports 511 and 512 connected to the ring circuit, and the port 513 connected to the external circuit. This address determination unit 41 transfers the frame and information on an output port to the separation unit 37 after confirming an operation mode of the output port being an output destination of the frame transferred by using the port set information table 36.

The configurations of the relay devices 22 to 24 are the same as that of the relay device 21 illustrated in FIG. 2. Further, in FIG. 1, each port of the relay devices 22 to 24 is followed by a different reference sign.

Next, a hardware configuration of the relay device 21 according to the first embodiment will be described.

The relay device 21 may be realized by a processing circuitry of a dedicated hardware component, or may be realized by a central processing unit (CPU), etc. to execute a program stored in a memory.

First, description will be made on a case wherein the relay device 21 is realized by a processing circuitry of a dedicated hardware component.

Figure 3:
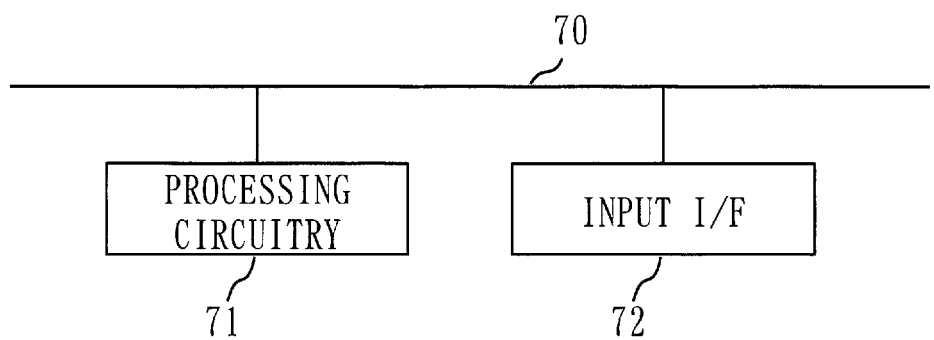
FIG. 3 is one example of a hardware block diagram of the relay device according to the first embodiment.

FIG. 3 is one example of a hardware block diagram of the relay device 21 according to the first embodiment. The configuration of the relay device 21 according to the first embodiment will be described with reference to FIG. 3.

The relay device 21 is configured by, as one example, a bus 70, a processing circuitry 71 and an input I/F (interface) 72.

The bus 70 is a signal path to electrically connect units in the relay device 21 with one another, and exchange data between each unit. The communication to be used may be a wire communication or a radio communication.

The processing circuitry 71 is, for example, a single circuit, a composite circuit, a processor made into a program, an ASIC (application specific integrated circuit), or an FPGA (field-programmable gate array), etc., or a combination thereof. Each function of the input processing units 31*a* to 31*c*, the multiplex unit 32, the FDB table 33, the ERP unit 34, the learning unit 39, the search unit 43, the destination determination unit 41, the timer unit 40, the port set information table 36, the separation unit 37, the output processing units 38*a* to 38*c*, and the ports 511 to 513 is realized by the processing circuitry 71. The processing circuitry 71 is connected to the input I/F 72 via the bus 70.

The functions of each unit in the relay device 21 may be realized by separate processing circuitries 71, or the functions of each unit may be realized as a whole by one processing circuitry 71.

The input I/F 72 is a device which can input information of values of the set time. The input I/F 72 is a device to present candidates of values of a plurality of set times beforehand, to select a set time among them, and to accept an input, or a device to accept an input of the value of the set time itself as a numeral character, etc., for example, a keyboard which can inputting values, a touch panel to detect an input with a button displayed on a screen, etc. The input unit 42 is realized by the input I/F 72. The input I/F 72 is connected to the processing circuitry 71 via the bus 70.

Next, a description will be provided on a case wherein the relay device 21 is realized by a CPU to execute a program stored in a memory.

Figure 4:
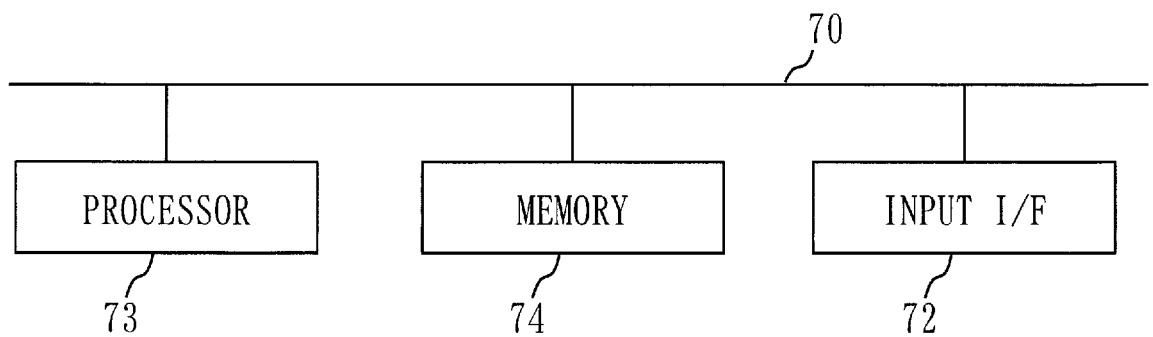
FIG. 4 is another example of a hardware block diagram of the relay device according to the first embodiment.

FIG. 4 is another example of a hardware block diagram of the relay device 21 according to the first embodiment. With reference to FIG. 4, the configuration of the relay device 21 according to the first embodiment will be described.

In another example, the relay device 21 includes the bus 70, the processor 73, the memory 74 and the input I/F 72.

The bus 70 is a signal path to make each unit electrically connect with one another in the relay device 21, and to exchange data. The communication to be used may be a wire communication or a wireless communication.

The processor 73 is a CPU to execute a program stored in the memory 74.

The processor 73 is realized by software, firmware or a combination of software and firmware. The processor 73 realizes functions of each unit by loading at least a part of an OS (operating system) stored in the memory 74, and reading and executing the program stored in the memory 74 while executing the OS. It is enough for the processor 73 to be an IC (integrated circuit) to perform processing; therefore, the processor 73 may be a central processing unit, an arithmetic unit, a microprocessor, a microcomputer, a processor, a DSP (digital signal processor), etc., or a combination thereof. Each function of the input processing circuits 31*a* to 31*c*, the multiplex unit 32, the FDB table 33, the ERP unit 34, the learning unit 39, the search unit 43, the destination determination unit 41, the timer unit 40, the port set information table 36, the separation unit 37, the output processing units 38*a* to 38*c* and the ports 511 to 513 is realized by reading and executing the program loaded into the memory 74 by the processor 73. The processor 73 is connected to the memory 74 and the input I/F 72 via the bus 70.

The functions of each unit of the relay device 21 may be realized by separate processors, or the functions of each unit may be realized as a whole by one processor.

The memory 74 stores software, firmware or a program wherein a combination of software and firmware is described, the OS and various information, etc. The memory 74 is a non-volatile or volatile semiconductor memory, a magnetic disk, a flexible disk, an optical disk, a compact disc, a mini disc, a DVD (digital versatile disc), etc., for example, a random access memory (RAM), a read only memory (ROM), a flash memory, an erasable programmable read only memory (EPROM), an electrically erasable programmable read only memory (EEPROM), and a hard disk drive (HDD), etc. Each function of the input processing units 31*a* to 31*c*, the multiplex unit 32, the FDB table 33, the ERP unit 34, the learning unit 39, the search unit 43, the destination determination unit 41, the timer unit 40, the port set information table 36, the separation unit 37, the output processing units 38*a* to 38*c* and the ports 511 to 513 are realized by the program stored in the memory 74. The memory 74 is connected to the processor 73 and the input I/F 72 via the bus 70.

The memory 74 may realize functions of each unit by separate memories, or the functions of each unit may be realized as a whole by one memory.

The input I/F 72 is a device which can input information of values of the set times as in FIG. 3. The input I/F 72 is a device to present candidates of values of a plurality of set times beforehand, to select a value of a set time among them, and to accept an input, or a device to accept an input of the value itself of the set time as a numeral character, etc., for example, a keyboard which can input values, a touch panel to detect an input with buttons displayed on a screen, etc. The input unit 42 is realized by the input I/F 72. The input I/F 72 is connected to the processor 73 and the memory 74 via the bus 70.

Functions of each unit of the relay device 21 is realized by hardware, software, firmware or a combination of hardware, software and firmware. A part of the functions of each unit of the relay device 21 may be realized by dedicated hardware, and a part of the functions may be realized by software or firmware. For example, the functions of a part of the relay device 21 may be realized by a processing circuitry as a dedicated hardware component, and the functions of the rest part may be realized by reading and executing a program stored in a memory by the CPU.

The hardware configurations of the relay device 22 to 24 are the same as the configurations of the relay device 21 illustrated in FIG. 3 and FIG. 4.

Next, the operation of the relay device 21 will be described. First, an operation to set a set time will be described.

Figure 5:
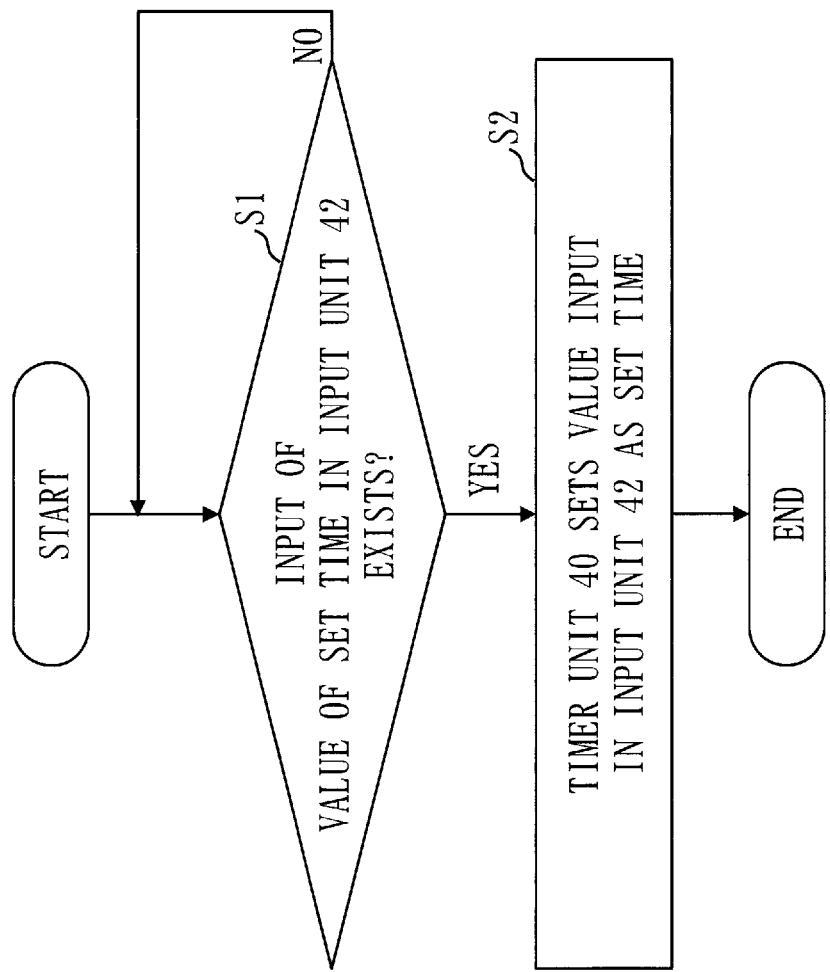
FIG. 5 is a flowchart illustrating an operation to set a set time according to the first embodiment.

FIG. 5 is a flowchart illustrating the operation to set the set time according to the first embodiment. With reference to FIG. 5, the operation to set the set time will be described below.

In step S1, the input unit 42 receives a frame including a destination address which the FDB table 33 has not learned yet, and accepts an input of a value of a set time to transfer the frame to a port connected to a ring circuit among the port the connected to the ring circuit and a port connected to an external circuit. The input unit 42 may present candidates of values of a plurality of set times beforehand, select a value of a set time from them, and accept an input, or may accept an input of the value itself of the set time as a numeral character. In the input unit 42, when an input of the value of the set time exists, step 1: Yes is given. The input unit 42 transmits information on the value of the set time to the timer unit 40, and the procedure proceeds to step S2. Meanwhile, in the input unit 42, when there is no input of the value of the set time, step 1: No is given, and the procedure is returned to step S1.

The set time is set by taking into account a time obtained by summing up a switching time to switch a transfer path to transfer a frame, and a first learning time of the FDB table 33. In a case wherein a failure is detected by receiving a failure detection frame, etc. by the relay device 21, it is assumed that the switching time is obtained by summing up a time to clear the FDB table 33 and a time wherein the failure notification frame is transmitted to the relay devices 21 to 24 connected to the ring circuits. As an example, the switching time is assumed to be a maximum value calculated by using the time to clear the FDB table 33, a line speed of the ring circuit, a retention time of the failure detection frame inside the relay device, a propagation delay time of the frame between the relay devices, and the number of other relay devices connected to the ring circuits. It is preferable that the switching time is a value calculated by using at least the retention time of the failure detection frame inside the relay device and the number of other relay devices connected to the ring circuits. The first learning time of the FDB table 33 is, as one example, a time for a period of a frame made to flow periodically between devices including the relay devices and the communication devices. The frame is: for example, in a case of a wireless device to detect a position of a train, and to control the train, a frame, etc. including data to periodically notify position information and control information, etc., and data to control, etc.; in a case of an FA (factory automation), a frame, etc. including data to control equipment to operate a manufacturing line of a factory; and in a case of a monitoring camera, a frame, etc. including data of pictures and images transmitted at fixed intervals. The first learning time of the FDB table 33 is, for example, a value calculated by using a period of traffic flowing in a network.

By setting these values, it is possible to reduce flooding to transfer a frame to both of a port connected to the ring circuit and a port connected to an external circuit in a case wherein a time clocked exceeds the set time, and it is possible to suppress the traffic load.

In step S2, when information on the value of the set time is received from the input unit 42, the timer unit 40 sets the value received as the set time. Specifically, the timer unit 40 stores the information on the value of the set time received from the input unit 42.

After step S2 is performed, the procedure is returned to step S1, and the process as described above is repeated until a trigger to end the process, such as turning off the power, or a termination operation being performed, etc. occurs. Although it is described that the processing as above is repeated, the processing may be performed only once without being repeated.

Next, description will be made on an operation in a case wherein the ERP unit 34 detects the clearing condition of the FDB table 33 accompanying switching of a transfer path of a ring circuit.

Figure 6:
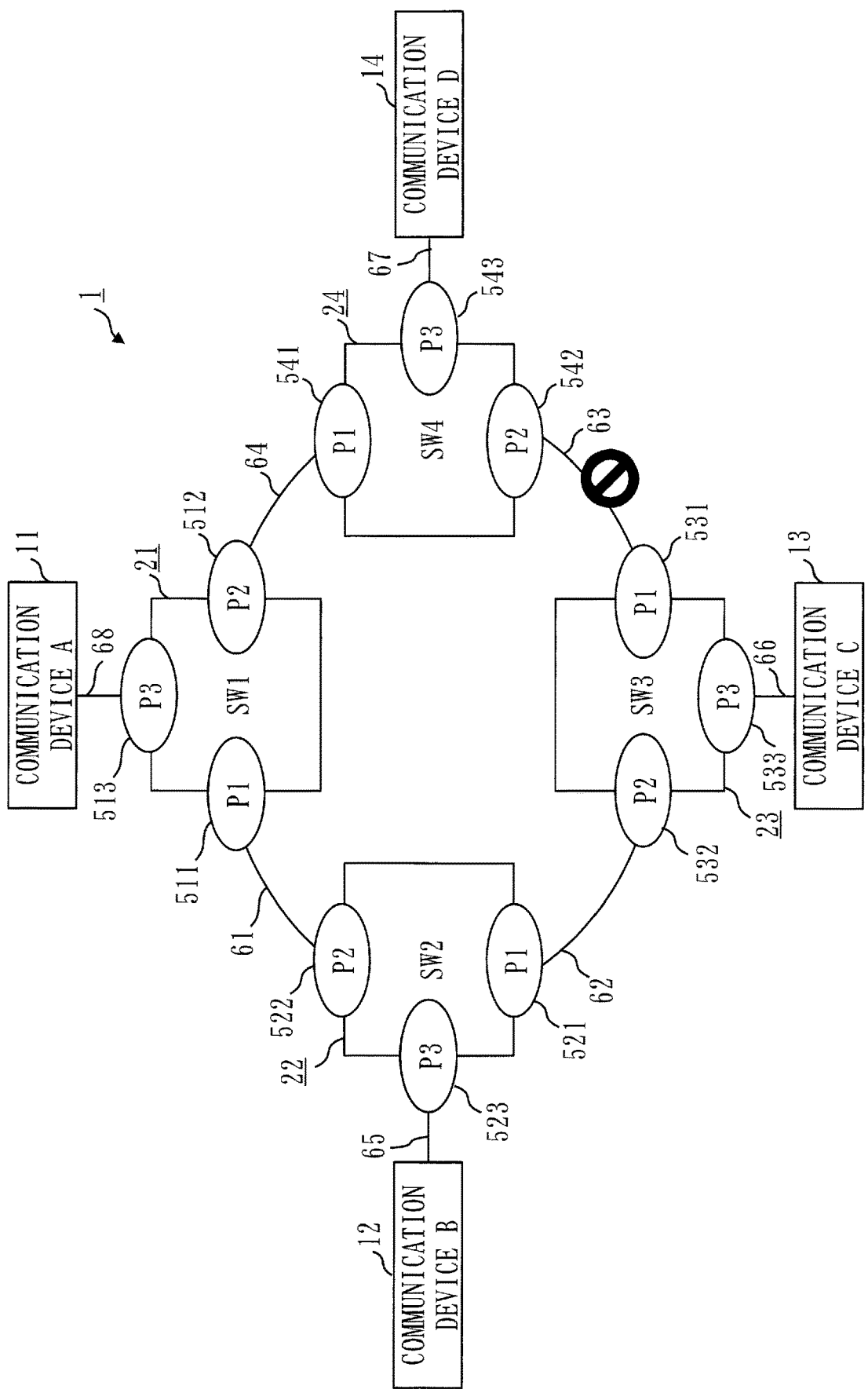
FIG. 6 is a block diagram of a relay system 1 in a case wherein it becomes necessary for an FDB table to be cleared according to the first embodiment.

FIG. 6 is a block diagram of the relay system 1 in a case wherein it becomes necessary to clear the FDB table 33 according to the first embodiment. With reference to FIG. 6, description will be made below on a case wherein a failure occurs, for example, inside the ring circuit in FIG. 1. In the block diagram of FIG. 6, a part different from FIG. 1 is a place to be closed, and the same constituents as those in FIG. 1 are followed by the same numbers.

FIG. 6 illustrates a case wherein, inside of the network of the relay system 1 in FIG. 1, a failure occurs in the ring circuit 63 between the relay device 23 and the relay device 24. In the relay system 1, when the failure occurs at the ring circuit 63 between the relay device 23 and the relay device 24, the relay device 23 and the relay device 24 transmit a failure notification frame, and the ring circuit 63 is closed between the relay device 23 and the relay device 24. Specifically, the port 531 of the relay device 23 and the port 542 of the relay device 24 are set as closed ports. Meanwhile, the relay system 1 cancels closing of the ring circuit 62 between the relay device 22 and the relay device 23. Specifically, when the relay device 22 and the relay device 23 receive the failure notification frame, the setting of the port 521 of the relay device 22 being the closed port is cancelled. As described, by cancelling closing of the port 521 of the relay device 22, it is possible to transfer a frame via a new transfer path. Specifically, for example, when a frame is transmitted from the communication device 12 to the communication device 13, the relay device 22 that receives the frame transmitted from the communication device 12 at the port 523 outputs the frame from the port 521, and then the frame is transferred to the relay device 23, and transmitted to the communication device 13 from the port 533 of the relay device 23.

As described, when a failure occurs inside the network of the relay system 1, the necessity to switch a transfer path of the frame to be transferred to each destination address to another transfer path made redundant occurs, and the necessity to switch a port to output the frame in each relay device in accordance with the other transfer path switched also exists. In this case, each relay device inside the network clears the address table by first deleting address information corresponding to the port connected to the ring circuit from the address table, and performs learning processing of the address table in the same manner as before the failure occurs.

The time when the relay device 21 receives a failure notification frame is when a transfer path of a frame is switched from a state wherein the ring circuit 62 is closed as in FIG. 1, by closing the ring circuit 63 and cancelling closing of the ring circuit 62, due to occurrence of a failure in the ring circuit 63 as in FIG. 6.

The failure notification frame is one example of a state notification frame including the clearing request of the FDB table 33, and it is enough for the failure notification frame to be a frame to notify a failure state in a network such as an R-APS (ring auto protection switching), etc., i.e., to notify that clearing the FDB table 33 is necessary, that is, a frame including the clearing request of the FDB table 33. The clearing request includes detection of a failure state in the network by own device, and notification of the information to the inside of the own device. A case wherein the clearing condition of the FDB table 33 accompanying switching of a transfer path of a trunk network is detected corresponds to, for example: a case wherein a state notification frame including the clear request of the FDB table 33 including a failure notification frame, etc. wherein information including the clearing request of the FDB table 33 is stored is received; a case wherein a failure notification frame wherein storage information is changed is received; a case wherein a failure of a trunk circuit is detected by the relay device 21 itself; and a case wherein a transfer path is switched forcibly by a setting, etc., which is one example of a case wherein the FDB table 33 is cleared at a switching time of a transfer path of a trunk network to transfer the frame received via the ports 511 to 513.

In the first embodiment, as one example of a case wherein the FDB table 33 is cleared at the switching time of the transfer path of the trunk network to transfer the frame received via the ports 511 to 513, description is made on a case wherein a failure notification frame storing information including the clearing request of the FDB table 33 is received.

FIG. 7 is a flowchart illustrating an operation in a case wherein the ERP unit 34 detects the clearing condition of the FDB table 33 according to the first embodiment. With reference to FIG. 7, description will be made on an operation in a case wherein the ERP unit 34 detects the clearing condition of the FDB table 33.

In step S11, in a case wherein the FDB table 33 is cleared at the switching time of the transfer path of the trunk network to transfer the frame received via the ports 511 to 513, the ERP unit 34 gives an instruction to clear the FDB table 33. Specifically, in a case wherein the failure notification frame is received via the ports 511 to 513, the input processing units 31*a* to 31*c* and the multiplex unit 32, the ERP unit 34 gives an instruction to clear the FDB table 33. In a case wherein information on a port attribute stored is information to indicate that a port indicated by a port number corresponding to the port attribute is a port connected to an external circuit, the port number corresponding to the port attribute is not cleared even when the FDB table 33 is cleared at the switching time of the transfer path.

FIG. 8 is one example of the FDB table 33 of each of the relay devices 21 to 24 before the failure in FIG. 1 occurs according to the first embodiment. An FDB table 331 is stored in the FDB table 33 of the relay device 21, an FDB table 332 is stored in the FDB table 33 of the relay device 22, an FDB table 333 is stored in the FDB table 33 of the relay device 23, and an FDB table 334 is stored in the FDB table 33 of the relay device 24. In each table, information on port attributes of ports, information on output ports, and information on MAC (media access control) addresses are associated with one another and stored.

The information on the MAC addresses is information on addresses of the communication devices. It is supposed that a MAC address of the communication device 11 is a MAC address A, a MAC address of the communication device 12 is a MAC address B, a MAC address of the communication device 13 is a MAC address C, and a MAC address of the communication device 14 is a MAC address D. The information on the output ports is information on port numbers indicating ports corresponding to the addresses of the communication devices. The information on the port attributes is information indicating attributes of circuits whereto ports indicated by the port numbers corresponding to the MAC addresses are connected. Specifically, the information on the port attributes is information indicating whether circuits whereto the output ports are connected are ring circuits or external circuits. In the FDB table 33, it is supposed that at least information whereof the port attributes correspond to the external circuits is set beforehand at the time of starting operation of the network.

For example, in the FDB table 331 in FIG. 8, when the relay device 21 receives a frame intended for the MAC address A, it is indicated that the port number of the port to output the frame intended for the MAC address A is P3, and the port attribute of the port number P3 is an external circuit. That is, the FDB table 33 stores information on an output port and information on a port attribute for each MAC address.

The FDB table 33 is one example of a first storage unit, and it is enough for the FDB table 33 to be any kind of storage units only if the FDB table 33 stores the addresses of the communication devices, and the port numbers indicating the ports corresponding to the addresses. Further, it has been described that the MAC addresses are stored in the FDB table 33; however, the information is not limited to the MAC addresses only if the information is information on the addresses of the communication devices whereby destinations are identifiable. It has been described that the information on the output ports is information on the port numbers of the ports to output a frame transferred to the MAC addresses; however, the port numbers include information, etc. corresponding to the ports, such as signs, etc. corresponding to the ports. Although it has been described that the information on either a ring circuit or an external circuit is stored in the port attribute in the case wherein the network includes a ring trunk network, the information is not limited to the information on either the ring circuit or the external circuit, and the information stored may be information on either a ring circuit or not, or numbers, etc. corresponding to the ring circuit or the external circuit. In a case wherein the information is applied to a trunk network not being a ring type, the information may be information on whether a connection destination is a relay device or not, or information on either a relay circuit being a circuit connecting to the relay device, or an external circuit connecting to the communication device.

Further, the FDB table 33 may store not only the information of the port attributes, the information on the output ports and the information on the MAC addresses, but also other information such as a VLAN (virtual LAN), etc.

Returning to FIG. 7, in step S11, the FDB table 33 specifically clears, at a time of clearing the FDB table 33, the information on the output ports whereof the port attributes are the ring circuits, and the information on the MAC addresses stored in the FDB table 33, and the information on the output ports whereof the port attributes are the external circuits, and the information on the MAC addresses stored in the FDB table 33 are made to remain as they are without being cleared. That is, the FDB table 33 clears the information on the MAC addresses B to D whereof the port attributes are ring circuits, and information on the output ports corresponding to the MAC addresses B to D stored in the FDB table 331 included by the relay device 21 of FIG. 8, and the procedure proceeds to step S12.

The FDB table 33 does not clear information on the MAC address A whereof the port attribute is an external circuit, and on the output port that corresponds to the MAC address A. In this manner, in a case wherein the FDB table 33 is cleared, and information on a port attribute of a port corresponding to a MAC address being the same address as a MAC address of a destination address included in a frame is an external circuit, only if learning processing of a port number corresponding to the MAC address being the same address as the MAC address of the destination address included in the frame has been performed before the FDB table 33 is cleared, the information on the output port whereof the port attribute is the external circuit, and the information on the MAC address stored in the FDB table 33 are made to remain as they are without being cleared at the time when the FDB table 33 is cleared; therefore, it is possible to obtain the port number corresponding to the MAC address being the same address as the MAC address of the destination address included in the frame. Then, by transferring the frame to the port indicated by the port number obtained, even when the FDB table 33 is cleared due to occurrence of a failure, it is possible for the relay device 21 to relay the frame to the communication device. Specifically, for example, in a case wherein the relay device 21 receives the frame intended for the communication device 11 via a port, even when the FDB table 33 is cleared due to occurrence of a failure, it is possible to relay the frame to the communication device 11.

In step S12, in a case wherein the clearing condition of the FDB table 33 is detected, the ERP unit 34 gives an instruction to clear the FDB table 33, and to transmit an instruction to make the timer unit 40 start clocking so that clocking is started by the timer unit 40. Specifically, in a case wherein a failure notification frame is received via the ports 511 to 513, the input processing units 31a to 31c and the multiplex unit 32, the ERP unit 34 gives an instruction to clear the FDB table 33, and transmits an instruction to make the timer unit 40 start clocking so that clocking is started by the timer unit 40. When the instruction to start clocking is received from the ERP unit 34, the timer unit 40 starts clocking, and finishes an operation in a case wherein the ERP unit 34 illustrated in FIG. 7 detects the clearing condition of the FDB table 33.

The timer unit 40 clocks until the value of the set time stored in the timer unit 40 beforehand; however, it is only necessary for the timer unit 40 to be able to clock a value up to the set value, and the timer unit 40 may be a timer to subtract a value from the set time, or a timer to add a value up to the set time, etc. Further, although it has been described that the timer unit 40 starts clocking when an instruction to start clocking is received from the ERP unit 34, the timer unit 40 is not limited to this if only clocking can be started when the FDB table 33 is cleared, such that clocking is started when a failure notification frame is received at the ports 511 to 513, and so on.

Furthermore, the ERP unit 34 transfers a failure notification frame if needed after the operation in step S12 is finished. In a case of transfer, the ERP unit 34 transfers the failure notification frame to the separation unit 37.

Additionally, in FIG. 7, operations of step S11 and step S12 are performed in this order; however, either may be performed ahead, or both may be performed at the same time.

Returning to step S11 after step S12 is performed as well, the process as described above is repeated until a trigger to end the process, such as turning off the power, or a termination operation being performed, etc. occurs. Although it is described that the processing as above is repeated, the processing may be performed only once without being repeated.

Next, a transfer operation of a unicast frame will be described.

Figure 9:
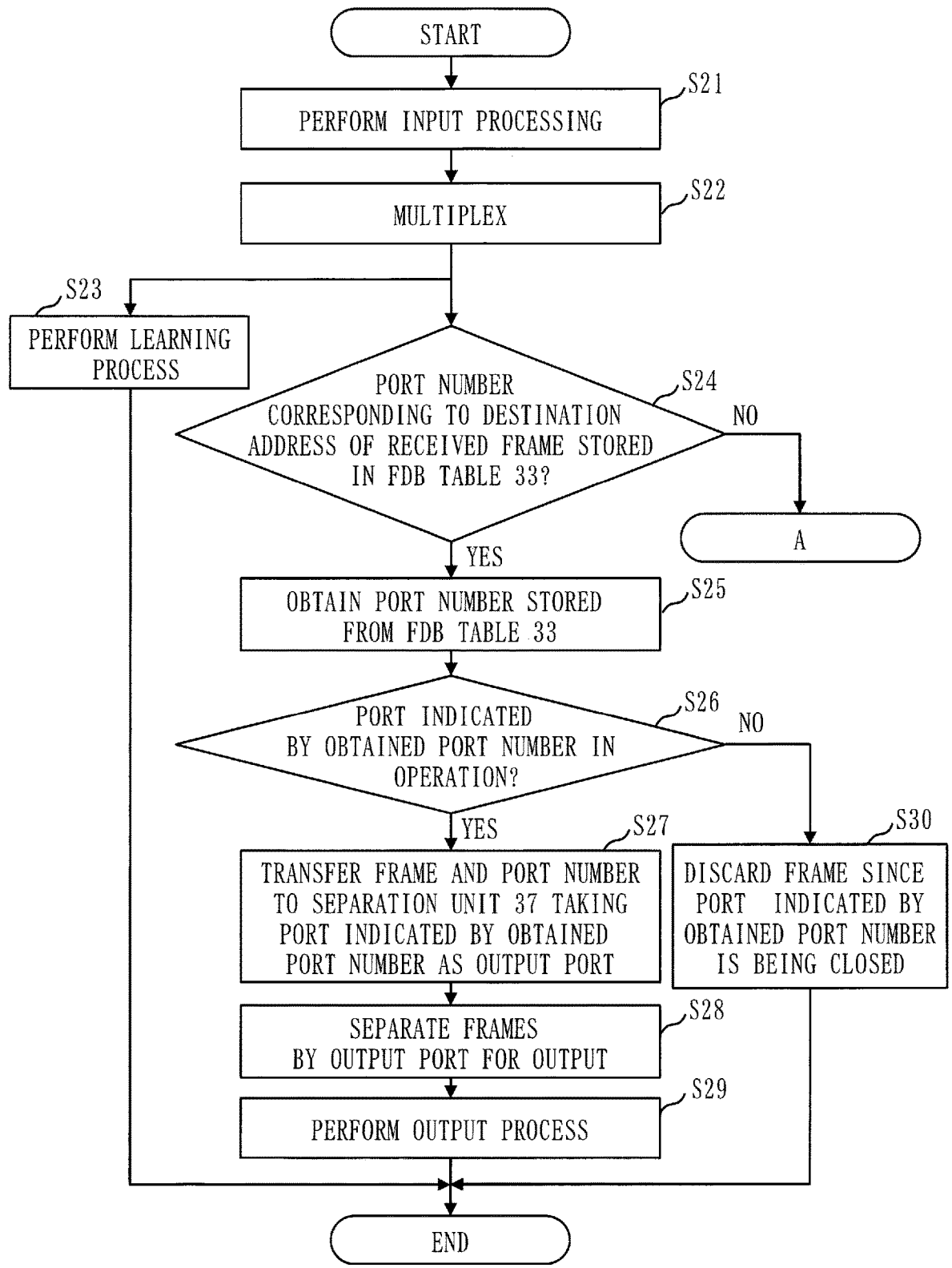
FIG. 9 is a flowchart illustrating a transfer operation of a unicast frame according to the first embodiment.

FIG. 9 is a flowchart illustrating the transfer operation of the unicast frame according to the first embodiment. With reference to FIG. 9, the transfer operation of the unicast frame will be described below.

In step S21, when a frame is received from the ring circuit 61 whereto the port 511 is connected, the port 511 of the relay device 21 transfers the frame to the input processing unit 31a. When the frame is received from the port 511, the input processing unit 31a identifies the frame, etc. and performs preprocessing of the multiplex unit 32. The input processing unit 31a transfers the frame preprocessed to the multiplex unit 32, and the procedure proceeds to step S22.

Similarly, when a frame is received from the ring circuit 64 whereto the port 512 is connected, the port 512 transfers the frame to the input processing unit 31b. When the frame is received from the port 512, the input processing unit 31b identifies the frame, etc., and performs preprocessing of the multiplex unit 32. The input processing unit 31b transfers the frame preprocessed to the multiplex unit 32, and the procedure proceeds to step S22. When a frame is received from the external circuit 68 whereto the port 513 is connected, the port 513 transfers the frame to the input processing unit 31c. When the frame is received from the port 513, the input processing unit 31c identifies the frame, etc., and performs preprocessing of the multiplex unit 32. The input processing unit 31c transfers the frame preprocessed to the multiplex unit 32, and the procedure proceeds to step S22.

In step S22, when the frames are received from the input processing units 31a to 31c, the multiplex unit 32 extracts destination addresses and source addresses in the frames received, and performs multiplexing processing to summarize the frames received from a port or a plurality of ports for frame processing. The multiplex unit 32 transfers the frames multiplexed other than frames for ERP control including a failure notification frame to the learning unit 39 and the search unit 43, and the procedure proceeds to step S23 and step S24. In the first embodiment, step 23 and step 24 performs processing in parallel.

When the frames for ERP control including the failure notification frame are received, the multiplex unit 32 transfers the failure notification frame to the ERP unit 34. Further, the multiplex unit 32 determines whether a frame is a frame for ERP control or not by analyzing a header of the frame, a command of data, etc.; however, the input processing units 31*a* to 31*c* may make the determination.

In step S23, when a frame is received from the multiplex unit 32, the learning unit 39 performs learning processing to learn by registering as, or updating to a port number indicating a port that has received the frame, a port number stored in the FDB table 33 corresponding to a MAC address being the same address as a MAC address of a source address included in the frame received via the port.

FIG. 10 is one example of the frame 80 according to the first embodiment.

The frame 80 includes information on a destination MAC address being a destination address, information on a source MAC address being a source address and information on transmission content data. For example, when it is desired to transmit the information on transmission content data having certain content to the communication device 12 from the communication device 11 in FIG. 1, the frame 80 is transmitted to the communication device 12 from the communication device 11, and the relay device 21 and the relay device 22 relay the frame. In this case, the frame 80 stores the MAC address B being the MAC address of the communication device 12 in the destination MAC address, and the MAC address A being the MAC address of the communication device 11 in the source MAC address. The frame 80 also stores information on types of frames, etc., which are not shown.

Returning to FIG. 9, when the frame 80 as illustrated in FIG. 10, storing the MAC address A being the MAC address of the communication device 11 in the destination MAC address, and the MAC address C being the MAC address of the communication device 13 in the source MAC address is received from the port 511 with the port number P1, the learning unit 39 performs learning processing to store the MAC address C being the source MAC address of the frame 80 as a MAC address, and the port number P1 indicating the port 511 that has received the frame 80 as information of an output port corresponding to information of the MAC address, in the FDB table 331 included in the relay device 21 in FIG. 8, and to learn the FDB table 33.

At this time, when there is no change from a state wherein the ring circuit 62 is closed as in FIG. 1, and no change in a transfer path of a frame, for example, the content stored in the FDB table 33 does not change. However, for example, when a failure occurs in the ring circuit 63 as in FIG. 6, and a transfer path of a frame is switched, or when connection of a new communication device to the network occurs, etc. from a state wherein the ring circuit 62 is closed as in FIG. 1, it is necessary to change the content stored in the FDB table 33.

FIG. 11 is one example of the FDB table 33 of each of the relay devices 21 to 24 after a failure occurs in FIG. 6 according to the first embodiment. The items of information stored in the FDB table 33 are the same as those in the example of the FDB table 33 in each of the relay devices 21 to 24 before the failure in FIG. 1 occurs according to the first embodiment in FIG. 8.

In a case wherein a failure occurs in the ring circuit 63 as in FIG. 6 from a state wherein the ring circuit 62 is closed as in FIG. 1, the ring circuit 63 is closed, and a transfer path of a frame is switched by canceling closing of the ring circuit 62, for example, the learning unit 39 learns again the FDB table 33 in FIG. 11 from the FDB table 33 in FIG. 8, by using the frame 80. The changes from FIG. 8 to FIG. 11 are changes of information on the output port corresponding to the MAC address C being the MAC address in the FDB table 331 from P2 to P1, of information on the output port corresponding to the MAC address C being the MAC address in the FDB table 332 from P2 to P1, of information on the output ports corresponding to the MAC address A, the MAC address B and the MAC address D being the MAC addresses in the FDB table 333 from P1 to P2, and of information on the output port corresponding to the MAC address C being the MAC address in the FDB table 334 from P2 to P1.

The learning unit 39 finishes the operation of the learning processing after the learning processing of the FDB table 33 is performed.

In step S24, the search unit 43 searches whether a port number corresponding to the same address as a destination address included in a frame received via a port is stored in the FDB table 33.

Specifically, for example, in a case wherein the search unit 43 transmits a frame to the communication device 12 from the communication device 11 in a state wherein the ring circuit 62 is closed as in FIG. 1, when the frame 80 as in FIG. 10 storing the MAC address B being the MAC address of the communication device 12 in the destination address, and the MAC address A being the MAC address of the communication device 11 in the source MAC address is received from the multiplex unit 32, the search unit 43 searches whether a port number corresponding to the same address as the MAC address B of the destination address included in the frame 80 received is stored in the FDB table 331 included in the relay device 21 in FIG. 8. In a case of the FDB table 331 in FIG. 8, since information on the port number P1 of the output port is stored, step S24:Yes is given, and the procedure proceeds to step S25.

Further, for example, in a case wherein a frame is transmitted to the communication device 11 from the communication device 12 in a state wherein, due to occurrence of a failure in the ring circuit 63 as in FIG. 6, the ring circuit 63 is closed, and by canceling closing of the ring circuit 62, the transfer path of a frame is switched, and the FDB table 33 is cleared, when the frame 80 as in FIG. 10 storing the MAC address A being the MAC address of the communication device 11 in the destination address and the MAC address B being the MAC address of the communication device 12 in the source MAC address is received from the multiplex unit 32, the search unit 43 searches whether a port number corresponding to the same address as the MAC address A of the destination address included in the frame 80 received is stored in the FDB table 331 after clearing. In step S11 in FIG. 7, since information on the MAC address A whereof the port attribute in the FDB table 331 is an external circuit, and on the output port corresponding to the MAC address A is not cleared, information on the port number P3 of the output port in the FDB table 331 included in the relay device 21 in FIG. 8 is stored without change in the FDB table 331 after clearing, step S24: Yes is given, and the procedure proceeds to step S25.

Meanwhile, in a case wherein the port number corresponding to the same address as the destination address included in the frame received via the port has not been learned yet after the FDB table 331 has been cleared, in the search unit 43, step S24: No is given. The search unit 43 receives unlearned information indicating that the FDB table 33 has not learned information on the port number corresponding to the same address as the destination address of the frame 80 and information on the port attribute yet from the FDB table 33. The search unit 43 transfers to the destination determination unit 41 the port number indicating the port that has received the frame 80, the information on the port attribute of the port that has received the frame 80, the unlearned information and the frame 80, and the procedure proceeds to a process A in FIG. 14 as described below.

In step S25, the search unit 43 obtains the port number corresponding to the same address as the destination address included in the frame received via the port from the FDB table 33. The port indicated by the port number obtained becomes a candidate for the output port. Further, the search unit 43 receives, from the FDB table 33, learned information indicating that the FDB table 33 has learned information on the port number corresponding to the same address as the destination address of the frame 80 and information on the port attribute.

Specifically, for example, in a case wherein a frame is transmitted to the communication device 12 from the communication device 11 in a state wherein the ring circuit 62 is closed as in FIG. 1, when the frame 80 as in FIG. 10 storing the MAC address B being the MAC address of the communication device 12 in the destination address and the MAC address A being the MAC address of the communication device 11 in the source MAC address is received from the multiplex unit 32, the search unit 43 obtains the information on the port number P1 stored as the information on the output port corresponding to the MAC address B being the destination MAC address, a ring circuit being the information on the port attribute, and the learned information, from the FDB table 331 included in the relay device 21 in FIG. 8. The search unit 43 transfers to the destination determination unit 41 the frame 80, the information on the port number P1 indicating the port to transfer the frame 80, the ring circuit being the information on the port attribute, and the learned information, and the procedure proceeds to step S26.

Further, for example, in a case wherein a frame is transmitted to the communication device 11 from the communication device 12 in a state wherein, due to occurrence of a failure in the ring circuit 63 as in FIG. 6, the ring circuit 63 is closed, a transfer path of a frame is switched by cancelling closing of the ring circuit 62, and the FDB table 33 is cleared, when the frame 80 as in FIG. 10 storing the MAC address A being the MAC address of the communication device 11 in the destination address and the MAC address B being the MAC address of the communication device 12 in the source MAC address is received from the multiplex unit 32, the search unit 43 obtains the information of the port number P3 stored as the information on the output port corresponding to the MAC address A being the destination MAC address stored without change, the external circuit being the information on the port attribute, and the learned information, from the FDB table included in the relay device 21. The search unit 43 transfers to the destination determination unit 41 the frame 80, the information on the port number P3 indicating the port to transfer the frame 80, the external circuit being the information of the port attribute, and the learned information, and the procedure proceeds to step S26.

In step S26, in a case wherein the learned information is received from the search unit 43, when a port indicated by the port number corresponding to the same address as the destination address of the frame 80 stored in the FDB table 33 is in operation, the destination determination unit 41 regards the port as an output port. The destination determination unit 41 confirms whether the port number obtained from the FDB table 33 is in operation, from the port set information table 36 included in the relay device 21.

Specifically, for example, in a case wherein a frame is transmitted to the communication device 12 from the communication device 11 in a state wherein the ring circuit 62 is closed as in FIG. 1, when the frame 80 as in FIG. 10 storing the MAC address B being the MAC address of the communication device 12 in the destination address and the MAC address A being the MAC address of the communication device 11 in the source MAC address, the information on the port number P1 indicating the port to transfer the frame 80, the ring circuit being the information on the port attribute, and the learned information are received from the search unit 43, the destination determination unit 41 obtains information on an operation state of a port whereof the port number indicating the port to transfer is P1 and whereof the information on the port attribute is the ring circuit obtained from the FDB table 33.

FIG. 12 is one example of the port set information table 36 of each of the relay devices 21 to 24 before the failure in FIG. 1 occurs according to the first embodiment. The port set information table 36 is a table to store information on output ports, information on port attributes of the output ports, and information on the operation states of the output ports in an associated manner. The port set information table 361 is stored in the port set information table 36 of the relay device 21, the port set information table 362 is stored in the port set information table 36 of the relay device 22, the port set information table 363 is stored in the port set information table 36 of the relay device 23, and the port set information table 364 is stored in the port set information table 36 of the relay device 24.

The information on the output port is information on a port number indicating an output port being an output destination for a frame. The information on the port attribute is information indicating an attribute of a circuit whereto the port indicated by the port number is connected. Specifically, it is information indicating whether the circuit whereto the output port is connected is a ring circuit or an external circuit. The information on the operation state is information indicating an operation state of the port indicated by the port number, indicating that the output port is in operation in a case wherein the information is 1, and indicating that the output port is being closed in a case wherein the information is 0.

For example, in the port set information table 361 in FIG. 12, in a case wherein the relay device 21 obtains the information on the port attribute of the output port P1 and the information on the operation state, it is indicated that the port attribute of the output port P1 is a ring circuit, the operation information on the output port P1 is 1, i.e., in operation. That is, the port set information table 36 stores information on port attributes and information on operation states of ports for each output post.

The port set information table 36 is one example, and may be any kind of storage unit. For example, in a case wherein information on operation states of output ports are associated with information on the output ports and stored in the FDB table 33, the FDB table 33 should be referred to instead of referring to the port set information table 36. Further, in the port set information table 36, information on the output ports may be associated with the information on the operation states of the output ports and stored, or other information such as a VLAN, etc. may be associated with the output ports and stored, without information on port attributes.

It has been described that, in the port set information table 36, the information on the output ports is information of port numbers indicating output ports being output destinations of a frame, and the port numbers also include information, etc.

corresponding to the ports such as symbols, etc. corresponding to the ports. Further, it has been described that, as information on the port attributes, information concerning the ring circuits or the external circuits is stored; however, the port attributes are not limited to the information concerning the ring circuits or the external circuits, and as the information on the port attributes, information concerning ring circuits or not, or numbers, etc. corresponding to the ring circuits or the external circuits may be stored. In a case of application to a trunk network not being ring-shaped, the information on the port attributes may be information concerning whether a connection destination is a relay device or not, or may be information concerning a relay circuit being a circuit connecting with a relay device or an external circuit connecting with a communication device, etc. It has been described that the information on the operation state indicates that the output ports are in operation in a case wherein the information is 1, and that the output ports are being closed in a case wherein the information is 0; however, the information on the operation states is not limited to this only if the information is information indicating the operation states of the output ports.

In the port set information table 36, it is supposed that, when an operation of a network is started, at least information on the port attributes corresponding to the external circuits is set, or information on attributes of connection devices is collected automatically at the time of port connection such as a start time of operation, etc., and updated at any time. In this manner, when a frame is received via a port after the FDB table 33 is cleared, it is possible to obtain a port number corresponding to the same address as a destination address included in the frame from the FDB table 33, transfer the frame to the port indicated by the port number obtained, and to relay the frame to a communication device existing beyond the port by transferring the frame to the port indicated by the port number obtained.

Returning to FIG. 9, in a case wherein a frame is transmitted to the communication device 12 from the communication device 11 in a state wherein the ring circuit 62 is closed as in FIG. 1, when the destination determination unit 41 receives from the search unit 43 the frame 80 as in FIG. 10 storing the MAC address B being the MAC address of the communication device 12 in the destination address and the MAC address A being the MAC address of the communication device 11 in the source MAC address, information on the port number P1 indicating the port to transfer the frame 80, the ring circuit being the information on the port attribute, and the learned information, information on an operation state of a port whereof the port number being information on the output port is P1, and the port corresponding to information whereof the information on the port attribute is a ring circuit is obtained by the destination determination unit 41 from the port set information table 361 included in the relay device 21 in FIG. 12, and whether the output port is being operated is confirmed the destination determination unit 41. In FIG. 12, since the operation state is 1, i.e., in operation, step S26: Yes is given, and the procedure proceeds to step S27.

Further, for example, in a case wherein a frame is transmitted to the communication device 11 from the communication device 12, in a state wherein the ring circuit 63 is closed due to occurrence of a failure in the ring circuit 63 as in FIG. 6, a transfer path of the frame is switched by cancelling closing of the ring circuit 62, and the FDB table 33 is cleared, when the destination determination unit 41 receives from the search unit 43 the frame 80 as in FIG. 10 storing the MAC address A being the MAC address of the communication device 11 in the destination address and the MAC address B being the MAC address of the communication device 12 in the source MAC address, information on the port number P3 indicating the port to transfer the frame 80, the external circuit being information on the port attribute, and the learned information, information on an operation state of a port whereof the port number indicating the port to transfer obtained from the FDB table 33 is P3, and whereof the information of the port attribute is an external circuit is obtained by the destination determination unit 41, from the port set information table 36.

FIG. 13 is one example of the port set information table 36 in each of the relay devices 21 to 24 after the failure in FIG. 6 has occurred according to the first embodiment. The items of information stored in the port set information table 36 are the same as those in an example of the port set information table 36 in each relay device 21 to 24 before the failure in FIG. 1 occurs according to the first embodiment in FIG. 12. When the failure occurs in the ring circuit 63 as in FIG. 6 from the state wherein the ring circuit 62 is closed as in FIG. 1, the ring circuit 63 is closed, and a transfer path of a frame is switched by canceling closing of the ring circuit 62, the port set information table 36 in FIG. 13 is learned again from the port set information table 36 in FIG. 12. A learning method does not matter. Changes from FIG. 12 to FIG. 13 are learned in such a manner that information on the operation state corresponding to P1 being information of the output port of the port set information table 362 is switched from 0 indicating being closed to 1 indicating in operation, information on the operation state corresponding to P1 being information of the output port of the port set information table 363 is switched from 1 indicating in operation to 0 indicating being closed, information on the operation state corresponding to P2 being information of the output port of the port set information table 363 is switched from 0 indicating being closed to 1 indicating in operation, and information on the operation state corresponding to P2 being information of the output port of the port set information table 364 is switched from 1 indicating in operation to 0 indicating being closed, whereas the port set information table 361 is not changed.

Returning to FIG. 9, in a case wherein a frame is transmitted to the communication device 11 from the communication device 12 in a state wherein the ring circuit 63 is closed due to occurrence of the failure in the ring circuit 63 as in FIG. 6, a transfer path of the frame is switched by cancelling closing of the ring circuit 62, and the FDB table 33 is cleared, when the destination determination unit 41 receives from the search unit 43 the frame 80 as in FIG. 10 storing the MAC address A being the MAC address of the communication device 11 in the destination address and the MAC address B being the MAC address of the communication device 12 in the source MAC address, information on the port number P3 indicating the port to transfer the frame 80, the external circuit being information on the port attribute, and the learned information, information on an operation state of a port whereof the port number being information of the output port is P3, and which corresponds to information whereof the information on the port attribute is an external circuit is obtained by the destination determination unit 41 from the port set information table 361 included in the relay device 21 in FIG. 13, and whether the output port is being operated is confirmed. In FIG. 13, since the operation state is 1, i.e., in operation, step S26: Yes is given, and the procedure proceeds to step S27.

Meanwhile, for example, unlike FIG. 12 and FIG. 13, in a case wherein information on an operation state corresponding to the frame 80 in the port set information table 361 included in the relay device 21 is 0, that is, being closed, or in a case wherein information on an operation state of a port corresponding to a port number being information on an output port and information on a port attribute does not exist, step S26: No is given, and the procedure proceeds to step S30.

In step S27, the destination determination unit 41 transfers a frame and a port number to the separation unit 37 by using the port indicated by the port number that the search unit 43 has obtained from the FDB table 33 as an output port.

Specifically, in a case wherein a frame is transmitted to the communication device 12 from the communication device 11 in a state wherein the ring circuit 62 is closed as in FIG. 1, when the destination determination unit 41 receives from the search unit 43 the frame 80 as in FIG. 10 storing the MAC address B being the MAC address of the communication device 12 in the destination address and the MAC address A being the MAC address of the communication device 11 in the source MAC address, information on the port number P1 indicating the port to transfer the frame 80, the ring circuit being information on the port attribute, and the learned information, the destination determination 41 transfers to the separation unit 37, by using P1 being the information on the port number being information on the output port in operation as an output port for an output of the frame 80, the frame 80 and P1 being the information on the port number indicating the port to transfer the frame 80, and the procedure proceeds to step S28.

Further, for example, in a case wherein a frame is transmitted to the communication device 11 from the communication device 12 in a state wherein the ring circuit 63 is closed due to occurrence of a failure in the ring circuit 63 as in FIG. 6, a transfer path of the frame is switched by cancelling closing of the ring circuit 62, and the FDB table 33 is cleared, when the destination determination unit 41 receives from the search unit 43 the frame 80 as in FIG. 10 storing the MAC address A being the MAC address of the communication device 11 in the destination address and the MAC address B being the MAC address of the communication device 12 in the source MAC address, information on the port number P3 indicating the port to transfer the frame 80, the external circuit being information on the port attribute, and the learned information, the destination determination 41 transfers to the separation unit 37 by using P3 being the information on the port number being the information on the output port in operation as an output port for an output of the frame 80, the frame 80 and P3 being the information on the port number indicating the port to transfer the frame 80, and the procedure proceeds to step S28.

When a plurality of ports to transfer the frame 80 exist, the destination determination unit 41 transfers to the separation unit 37 information on a plurality of port numbers to be transferred.

In step S28, when the frame 80 and the information on the output port are received from the destination determination unit 41, the separation unit 37 separates the frame 80 for each output port being an output destination for the frame 80. When the output port is the port 511, the separation unit 37 transfers the frame 80 to the output processing unit 38a, and the procedure proceeds to step S29. Similarly, when the output port is the port 512, the separation unit 37 transfers the frame 80 to the output processing unit 38b, and procedure proceeds to step S29. When the output port is the port 513, the separation unit 37 transfers the frame to the output processing unit 38c, and the procedure proceeds to step S29.

In step S29, when the frame 80 is received from the separation unit 37, the output processing unit 38a performs preprocessing of transfer of the frame 80 for which the port 511 is an output port, and transfers the frame 80 to the port 511. When the frame 80 is received from the output processing unit 38a, the port 511 transfers the frame 80 received to the ring circuit 612 whereto the port 511 is connected, and the relay device 21 finishes the operation. Similarly, when the frame 80 is received from the separation unit 37, the output processing unit 38b performs preprocessing of transfer of the frame 80 for which the port 512 is an output port, and transfers the frame 80 to the port 512. When the frame 80 is received from the output processing unit 38b, the port 512 transfers the frame 80 received to the ring circuit 64 whereto the port 512 is connected, and the relay device 21 finishes the operation. When the frame 80 is received from the separation unit 37, the output processing unit 38c performs preprocessing of transfer of the frame 80 for which the port 513 is an output port, and transfers the frame 80 to the port 513. When the frame 80 is received from the output processing unit 38c, the port 513 transfers the frame 80 received to the external circuit 68 whereto the port 513 is connected, and the relay device 21 finishes the operation.

Meanwhile, in step S30, in a case wherein information on an operation state of a port corresponding to a port number being information on the output port obtained from the port set information table 36 is not in operation, that is, being closed, or information on an operation state of a port corresponding to a port number being information on the output port and information on a port attribute does not exist, since it is impossible to transfer the frame 80 to the port number obtained from the FDB table 33, the destination determination unit 41 discards the frame 80, and finishes the operation.

After step S23, step S29 and step S30 are performed as well, the procedure is returned to step S21, and the process as described above is repeated until a trigger to end the process, such as turning off the power, or a termination operation being performed, etc. occurs. By handling each step as an independent process, a process can be repeated for each step.

FIG. 14 is a flowchart illustrating a process A being an operation following transfer of a unicast frame according to the first embodiment. With reference to FIG. 14, description will be made below on the process A in a case wherein a port number corresponding to a destination address of the frame 80 received following FIG. 9 is not learned by the FDB table 33. The case wherein the port number corresponding to the destination address of the frame 80 received is not learned by the FDB tale 33 is, for example, a case wherein a failure occurs in the ring circuit 63 as in FIG. 6, the FDB table 33 is cleared, and learning has not been performed much yet by the FDB table 33, and a case wherein a new communication traffic occurs, etc. FIG. 14 explains a case, for example, a failure occurs in the ring circuit 63 as in FIG. 6, the FDB table 33 is cleared, and learning has not been performed much yet by the FDB table 33.

In step S31, in a case wherein the destination determination unit 41 receives from the search unit 43 the frame 80, the port number indicating the port that has received the frame 80, the information of the port attribute of the port the frame 80 has received, and the unlearned information, the destination determination unit 41 performs processing in a case wherein the port number corresponding to the destination address of the frame 80 received has not learned the port number corresponding to the destination address of the frame 80 received due to reception of the unlearned information. The destination determination unit 41 inquires the timer unit 40 of whether the time clocked is within a set time. In a case wherein clocking the timer unit 40 has started from a time when a start instruction of clocking accompanying an instruction to clear the FDB table 33 is received from the ERP unit 34 shows a time within the set time, step S31: Yes is given. The timer unit 40 transfers information indicating being within the set time to the destination determination unit 41, and the procedure proceeds to step S32.

Meanwhile, in a case wherein a time clocked which is started from a time when a start instruction of clocking is received accompanying an instruction to clear the FDB table 33 from the ERP unit 34 exceeds the set time, step S31: No is given. The timer unit 40 transfers information indicating excess over the set time to the destination determination unit 41, and the procedure proceeds to step S37.

In step S32, when the destination determination unit 41 receives information indicating being within the set time from the timer unit 40, the destination determination unit 41 obtains from the port set information table 36 all port numbers indicating ports being information on output ports corresponding to information being in operation among ports connected to a ring circuit other than the port that has received the frame 80. For example, when the frame 80 is received from a port connected to an external circuit, since the frame 80 is transferred to a port connected to a plurality of ring circuits, the destination determination unit 41 occasionally obtains port numbers indicating ports being information on output ports for the number of the plurality of ports.

Specifically, the destination determination unit 41 obtains port numbers indicating ports in operation among ports connected to the ring circuit other than the port that has received the frame 80 from the port set information table 361 included in the relay device 21 in FIG. 13. For example, when the frame 80 is received from the port 511 indicated by the port number P1, the destination determination unit 41 obtains a port number P2 whereof the operation state is 1 indicating in operation among which the port attribute is a ring circuit, from among the port 512 and the port 513 indicated by P2 and P3 other than the port 511 indicated by the port number P1, step S32: Yes is given, and the procedure proceeds to step S33.

Meanwhile, for example, unlike FIG. 13, in a case wherein an operation state corresponding to the port number P2 is 0 indicating being closed, or a port attribute corresponding to the port number P2 is an external circuit, in the port set information table 361 included in the relay device 21, since a port number indicating a port in operation does not exist in the ports connected to the ring circuit other than the port that has received the frame 80, it is impossible for the destination determination unit 41 to obtain even one port number from the port set information table 361, step S32: No is given, and the procedure proceeds to step S36.

In step S33, the destination determination unit 41 transfers to the separation unit 37 the frame 80, and P2 being information of the port number indicating the port to transfer the frame 80, the port of the port number P2 indicating a port in operation as an output port of the output destination of the frame 80, among the ports connected to the ring circuit other than the port that has received the frame 80, obtained from the port set information table 36 in FIG. 13, and the procedure proceeds to step S34. For example, when the frame 80 is received from a port connected to an external circuit, there is a case wherein the frame 80 is transferred to a port connected to a plurality of ring circuits, and the destination determination unit 41 obtains port numbers indicating ports being information on output ports for the number of the plurality of ports, and transfers the port numbers for the number of the plurality of ports to the separation unit 37.

When a plurality of ports to transfer the frame 80 exist, the destination determination unit 41 transfers to the separation unit 37 information on the plurality of port numbers to be transferred.

Step 34 and step S35 are the same as step S28 and step S29 in FIG. 9.

Meanwhile, in step S36, in a case wherein it is impossible to obtain even one port number indicating a port in operation among ports connected to the ring circuit other than a port that has received the frame 80 from the port set information table 36, since there is no port to transfer the frame 80, the destination determination unit 41 discards the frame 80, and the operation is finished.

Above describes the cases wherein the time clocked by the timer unit 40 is within the set time in step S31; whereas it is next described a case wherein a time clocked by the timer unit 40 exceeds the set time, that is, a case of step S31: No.

In step S37, in a case wherein the destination determination unit 41 receives information indicating excess of the set time from the timer unit 40, the destination determination unit 41 obtains from the port set information table 36 all port numbers indicating ports being information of output ports corresponding to information being in operation among ports other than the port that has received the frame 80. The ports other than the port that has received the frame 80 mean all the ports other than the port that has received the frame 80 irrespective of a ring circuit or an external circuit.

The destination determination unit 41 obtains all the port numbers indicating ports in operation among ports other than the port that has received the frame 80, from the port set information table 361 included in the relay device 21 in FIG. 13. For example, in a case wherein the frame 80 is received from the port 511 indicated by the port number P1, the destination determination unit 41 obtains the port numbers P2 and P3 whose operation states are 1 indicating in operation from the port 512 and the port 513 indicated by P2 and P3 other than the port 511 indicated by the port number P1, step S37: Yes is given, and the procedure proceeds to step S38.

Meanwhile, for example, unlike FIG. 13, in a case wherein the operation states corresponding to the port numbers P2 and P3 are 0 indicating being closed, in the port set information table 361 included in the relay device 21, since there is no port number indicating a port in operation among the ports other than the port that has received the frame 80, it is impossible for the destination determination unit 41 to obtain even one port number from the port set information table 361, step S37: No is given, and the procedure proceeds to step S41.

In step S38, the destination determination unit 41 transfers to the separation unit 37, the frame 80, and P2 and P3 being information on the port numbers indicating the ports to transfer the frame 80, by regarding the ports of the port numbers P2 and P3 indicating that the ports are in operation as output ports for the output of the frame 80, among the ports other than the port that has received the frame 80, obtained from the port set information table 36, and the procedure proceeds to step S39.

The destination determination unit 41 transfers, when a plurality of ports to transfer the frame 80 exist, information on a plurality of port numbers through which transfer is performed, to the separation unit 37.

Step S39 and step S40 are the same as step S28 and step S29 in FIG. 9, and step S34 and step S35 in FIG. 14.

Meanwhile, in step S41, in a case wherein it is impossible to obtain even one port number indicating that a port is in operation among ports other than the port that has received the frame 80, from the port set information table 36, since there is no port to transfer the frame 80, the destination determination unit 41 discards the frame 80, and the procedure is finished.

After step S35, step S36, step S40 and step S41 are performed, the procedure returns to step S21 in FIG. 9 as well, and the process as described above is repeated until a trigger to end the process, such as turning off the power, or a termination operation being performed, etc. occurs. By handling each step as an independent process, it is possible to repeat the processes for each step.

The flowcharts of the relay devices 22 to 24 are similar to the flowcharts of the relay device 21 illustrated in FIG. 5, FIG. 7, FIG. 9 and FIG. 14. Further, in FIG. 6, each port of the relay devices 22 to 24 is followed by a different reference sign as in FIG. 1.

As described above, the relay system 1 according to the first embodiment includes the timer unit 40 and the destination determination unit 41. When an instruction to clear the FDB table 33 storing the addresses of the communication devices 11 to 14, and storing the port numbers indicating the ports corresponding to the addresses of the communication devices 11 to 14 is received from the ERP unit 34 that has detected a clearing condition of the FDB table 33, the timer unit 40 starts clocking. In a case wherein it is impossible for the search unit 43 which searches whether a port number corresponding to the same address as a destination address included in a frame received via a port is stored in the FDB table 33 to obtain the port number, and a time clocked by the timer unit 40 is within the set time, the destination determination unit 41 transfers a frame to a port connected to a trunk circuit among ports connected to the trunk circuit included in a redundant trunk network and ports connected to a branch circuit included in a branch network whereto the communication devices are connected. And in a case wherein it is impossible for the search unit 43 to obtain a port number, and a time clocked by the timer unit 40 exceeds the set time, the destination determination unit 41 transfers a frame to a port connected to the trunk circuit and a port connected to the branch circuit. Therefore, when a frame including a destination address the FDB table 33 has not learned yet is received, and the time clocked by the timer unit 40 is within the set time, in a case wherein an output port of the frame is a port connected the external circuit in the set time since the frame is transferred to a port connected to a ring circuit among ports connected to the ring circuit, and ports connected to an external circuit, the number of the frames to be transferred to the communication devices 11 to 14 connected to the relay devices 21 to 24 does not become large, and it is possible to suppress the traffic load on the communication devices 11 to 14.

Further, in the first embodiment, based on the instruction from the ERP unit 34, the FDB table 33 clears a port number whereof information on a port attribute of a port corresponding to the same MAC address as a MAC address of a destination address include in a frame is a ring circuit, but does not clear a port number whereof information on a port attribute is an external circuit. In this manner, in a case wherein the FDB table 33 is cleared, and the information on the port attribute of the port corresponding to a MAC address being the same address as the MAC address of the destination address included in the frame is an external circuit, when a learning process of the port number corresponding to the MAC address being the same address as the MAC address of the destination address included in the frame before the FDB table 33 is cleared, since the information on the output port whereof the port attribute stored in the FDB table 33 is the external circuit and the information on the MAC address are made to remain as they are without being cleared, it is possible to obtain the port number corresponding to the MAC address being the same address as the MAC address of the destination address included in the frame from the FDB table 33. Then, by transferring the frame to the port indicated by the port number obtained, it is possible for the relay device 21 to relay the frame to the communication devices even when a failure occurs and the FDB table 33 is cleared.

In the first embodiment, since the relay devices 21 to 24 make a special frame only for perform learning, and the special frame is not to be transmitted, it is possible to suppress the traffic load on the communication devices 11 to 14 without increasing the traffic load.

In the first embodiment, the relay devices 21 to 24 include the input unit 42 to accept input of a value of a set time, and by setting the value of the set time received as a set time when the information on the value of the set time is received from the input unit 42, the timer unit 40 makes it easy for a user to perform tuning of the relay system 1; however, the input unit 42 may be omitted, and the time unit 40 may store the set time beforehand.

In the first embodiment, in step S23 in FIG. 9, the learning unit 39 performs a learning process to register as or update to a port number indicating a port that has received a frame a port number stored in the FDB table 33 corresponding to a MAC address being the same address as a MAC address of a source address included in the frame received via the port; however, with respect to information on the port attribute in the FDB table 33 and the port set information table 36, the learning unit 39 may further collect, update at any time and learn information on an attribute of connected devices automatically at the time of port connection such as when the operation is started, etc.

In step S26 in FIG. 9 according to the first embodiment, the destination determination unit 41 confirms whether the port number obtained from the FDB table 33 is in operation based on the port set information table 36; however, the confirmation may not be made, and the frame and the port number obtained from the FDB table 33 may be transferred to the separation unit 37 as they are. In this case, it only happens that when the port indicated by the port number is being operated, the frame can be transferred, and when the port is being closed, the frame cannot be transferred from the port indicated by the port number.

In first embodiment, the relay devices 21 to 24 perform in parallel a learning process of the FDB table 33 in step S23 in FIG. 9, searching of a port number, etc. indicating a port to transfer a frame, and determination of a port to output in and after step S24; however, processing may be performed in an order of the learning process of the FDB table 33, searching of the port number, etc. indicating the port to transfer the frame, and determination of the port to output, or in an order of searching of the port number, etc. indicating the port to transfer the frame, determination of the port to output, and the learning process of the FDB table 33. Furthermore, searching of the port number, etc. indicating the port to transfer the frame, determination of the port to output and the learning process of the FDB table 33 may be performed immediately after an input process of the frame is performed by the input processing units 31a to 31c before multiplexing frames. In this case, with respect to an access to the FDB table 33, since a request of a process to search the port number, etc. indicating the port to transfer the frame, and of the learning process is transmitted from the input processing units 31a to 31c of a plurality of ports, conflict processing is performed. Further, each process of searching of the port number, etc. indicating the port to transfer the frame, determination of the port to output and the learning process of the FDB table may be processed separately. For example, searching of the port number, etc. indicating the port to transfer a frame and determination of the port to output may be performed after the input process, then the conflict processing may be performed, and the learning process may be performed after multiplexing.

In the first embodiment, description is made on the relay system 1 wherein the relay devices 21 to 24 of the present invention is applied to the ERP system being one example of a ring trunk network; however, it is possible to apply the present invention not only to the ERP system, but also to a network whereto relay devices and communication devices are connected. When it is applied to a trunk network not being ring-shaped, in a case wherein it is impossible for the search unit 43 to obtain a port number, and a time clocked by the timer unit 40 is within a set time, the destination determination unit 41 transfers the frame 80 to a port connected to a relay device among ports connected to the relay device and a port connected to a communication device; and in a case wherein it is impossible for the search unit 43 to obtain the port number, and the time clocked by the timer unit 40 exceeds the set time, the destination determination unit 41 has only to transfer the frame 80 to the port connected to the relay device and the port connected to the communication device. In a case wherein information on a port attribute stored is information indicating that a port indicated by a port number corresponding to the port attribute is a port connected to an external circuit, even when the FDB table 33 is cleared when a transfer path is switched, the FDB table 33 similarly does not clear the port number corresponding to the port attribute, and in a case wherein information on the port attribute stored is information indicating that the port indicated by the port number corresponding to the port attribute is a port connected to a relay circuit being a circuit connected to a relay device, the FDB table 33 clears the port number corresponding to the port attribute.

In the first embodiment, the relay system 1 includes four relay devices 21 to 24 and four communication devices 11 to 14; however, the number of the relay devices does not matter only if there are a plurality of relay devices. Further, the number of communication devices does not matter only if there is one or more communication devices. Additionally, in the first embodiment, one communication device is connected to one relay device; however, a plurality of communication devices may be connected to one relay device. In this case, the relay device includes the input processing unit 31 and the output processing unit 38 for each piece of external equipment.

In the first embodiment, description has been made on the case wherein one redundant ring trunk network exists in the relay system 1; however, the relay system 1 may be connected to a plurality of redundant trunk networks.

By the way, the relay devices, the relay systems, the relay method and the relay program described in the above embodiment are only an example, which may be configured in combination with other devices appropriately, and which are not limited to the configuration of the embodiment alone.

REFERENCE SIGNS LIST

1: relay system; 11-14: communication device; 21-24: relay device; 31a, 31b and 31c: input processing unit; 32: multiplex unit; 33: FDB table; 34: ERP unit; 35: control unit; 36: port set information table; 37: separation unit; 38a, 38b and 38c: output processing unit; 39: learning unit; 40: timer unit; 41: destination determination unit; 42: input unit; 43: search unit; 61-64: ring circuit; 65-68: external circuit; 70: bus; 71: processing circuitry; 72: input I/F; 73: processor; 74: memory; 80: frame; 331-334: FDB table; 361-364: port set information table; 511-513: port; 521-523: port; 531-533: port; 541-543: port

The invention claimed is:

1. A relay device comprising:
a port that is connected to a trunk circuit included in a trunk network which is made redundant;
a port that is connected to a branch circuit included in a branch network whereto a communication device is connected;
a memory to store an address of the communication device, and a port number indicating the port corresponding to the address; and
processing circuitry to:
start clocking in a case wherein the memory is cleared when a transfer path of the trunk network to transfer a frame received via one of the ports is switched;
search whether the port number corresponding to the address identical with a destination address included in the frame is stored in the memory, and obtain the port number stored when the port number is stored; and
transfer the frame to the port indicated by the port number when the searching obtains the port number; transfer the frame to a port that is connected to the trunk circuit among the port connected to the trunk circuit and a port connected to the branch circuit when the searching fails to obtain the port number, and when a clocked time is within a set time; and transfer the frame to the port connected to the trunk circuit and the port connected to the branch circuit when the searching fails to obtain the port number, and when the clocked time exceeds the set time, wherein
the memory stores information on a port attribute indicating an attribute of a circuit whereto the port indicated by the port number corresponding to the address is connected, and when the information on the port attribute stored in the memory is information indicating that the port indicated by the port number corresponding to the port attribute is the port connected to the branch circuit, even in a case wherein the memory is cleared when the transfer path is switched, the port number corresponding to the port attribute is not cleared.

2. The relay device as defined in claim 1, wherein the trunk network is a ring trunk network.

3. The relay device as defined in claim 1, wherein the set time is a time obtained by summing up a switching time to switch the transfer path to transfer the frame, and a first learning time of the memory.

4. The relay device as defined in claim 3, wherein the switching time is a value calculated by using at least a retention time in the relay device of a frame indicating a clearing request to clear the memory, and number of another relay device connected to the trunk circuit.

5. The relay device as defined in claim 3, wherein the first learning time is a value calculated by using a period of a traffic that flows in the network.

6. The relay device as defined in claim 1, wherein the processing circuitry accepts an input of a value of the set time, and sets the input value as the set time.

7. A relay system being a network relay system including a plurality of relay devices that are connected to a trunk circuit included in a trunk network which is made redundant, and a communication device that is connected to the plurality of relay devices via a branch circuit included in a branch network,
at least one relay device of the plurality of relay devices comprising:
a port that is connected to the trunk circuit;
a port that is connected to the branch circuit;
a memory to store an address of the communication device, and a port number indicating the port corresponding to the address; and
processing circuitry to:
start clocking in a case wherein the memory is cleared when a transfer path of the trunk network to transfer a frame received via one of the ports is switched;
confirm whether the port number corresponding to the address identical with a destination address included in the frame is stored in the memory, and obtain the port number stored when the port number is stored; and
transfer the frame to the port indicated by the port number when the searching obtains the port number; transfer the frame to a port that is connected to the trunk circuit among the port connected to the trunk circuit and a port connected to the branch circuit when the searching fails to obtain the port number, and when a clocked time is within a set time; and transfer the frame to the port connected to the trunk circuit and the port connected to the branch circuit when the searching fails to obtain the port number, and when the clocked time exceeds the set time, wherein
the memory stores information on a port attribute indicating an attribute of a circuit whereto the port indicated by the port number corresponding to the address is connected, and when the information on the port attribute stored in the memory is information indicating that the port indicated by the port number corresponding to the port attribute is the port connected to the branch circuit, even in a case wherein the memory is cleared when the transfer path is switched, the port number corresponding to the port attribute is not cleared.

8. A relay method comprising:
storing an address of a communication device, and a port number indicating a port corresponding to the address, the port being connected to a trunk circuit included in a trunk network which is made redundant, or being connected to a branch circuit included in a branch network connected to the communication device;
starting clocking, in a case wherein when a transfer path of the trunk network to transfer a frame received via the port is switched, the address of the communication device stored and the port number indicating the port corresponding to the address are cleared;
confirming whether the port number corresponding to the address identical with a destination address included in the frame is stored, and when the port number is stored, to obtain the port number stored; and
transferring the frame to the port indicated by the port number when the port number is obtained, to transfer the frame to the port that is connected to the trunk circuit among the port connected to the trunk circuit and the port connected to the branch circuit when it is impossible to obtain the port number, and a time clocked is within a set time, and to transfer the frame to the port connected to the trunk circuit and the port connected to the branch circuit when it is impossible to obtain the port number, and the time clocked exceeds the set time, wherein
the method further comprises storing information on a port attribute indicating an attribute of a circuit whereto the port indicated by the port number corresponding to the address is connected, and when the information on the port attribute stored in the memory is information indicating that the port indicated by the port number corresponding to the port attribute is the port connected to the branch circuit, even in a case wherein the memory is cleared when the transfer path is switched, the port number corresponding to the port attribute is not cleared.

9. A non-transitory computer-readable recording medium storing a relay program that causes a computer to execute:
a process to store an address of a communication device, and a port number indicating a port corresponding to the address, the port being connected to a trunk circuit included in a trunk network which is made redundant, or a branch circuit included in a branch network connected to the communication device;
a process to start clocking, in a case wherein when a transfer path of the trunk network to transfer a frame received via the port is switched, the address of the communication device stored and the port number indicating the port corresponding to the address are cleared;
a process to confirm whether the port number corresponding to the address identical with a destination address included in the frame is stored, and when the port number is stored, to obtain the port number stored; and
a process to transfer the frame to the port indicated by the port number when the port number is obtained, to transfer the frame to a port connected to the trunk circuit among the port connected to the trunk circuit and a port connected to the branch circuit when it is impossible to obtain the port number, and a time clocked is within a set time, and to transfer the frame to the port connected to the trunk circuit and the port connected to the branch circuit when it is impossible to obtain the port number, and the time clocked exceeds the set time, wherein
the relay program causes the computer to further execute:
a process to store information on a port attribute indicating an attribute of a circuit whereto the port indicated by the port number corresponding to the address is connected, and when the information on the port attribute stored in the memory is information indicating that the port indicated by the port number corresponding to the port attribute is the port connected to the branch circuit, even in a case wherein the memory is cleared when the transfer path is switched, the port number corresponding to the port attribute is not cleared.

* * * * *